(12) United States Patent  
Roberts, II et al.

(10) Patent No.: US 9,309,893 B2  
(45) Date of Patent: Apr. 12, 2016

(54) SUPERSONIC COMPRESSOR

(75) Inventors: William Byron Roberts, II, Wellington, NV (US); Shawn P. Lawlor, Bellevue, WA (US); Robert E. Breidenthal, Seattle, WA (US)

(73) Assignee: Dresser-Rand Company, Olean, NY (US)

(*) Notice: Subject to any disclaimer, the term of this patent is extended or adjusted under 35 U.S.C. 154(b) by 803 days.

(21) Appl. No.: 13/542,678

(22) Filed: Jul. 6, 2012

(65) Prior Publication Data

US 2013/0142632 A1 Jun. 6, 2013

Related U.S. Application Data

(60) Provisional application No. 61/506,055, filed on Jul. 9, 2011.

(51) Int. Cl.
| | |
|---|---|
| *F04D 21/00* | (2006.01) |
| *F04D 27/02* | (2006.01) |
| *F04D 29/56* | (2006.01) |
| *F04D 29/68* | (2006.01) |
| *F04D 29/54* | (2006.01) |

(52) U.S. Cl.
CPC ............ *F04D 21/00* (2013.01); *F04D 27/0207* (2013.01); *F04D 27/0215* (2013.01); *F04D 29/547* (2013.01); *F04D 29/563* (2013.01); *F04D 29/682* (2013.01); *Y02E 10/721* (2013.01); *Y10T 137/85938* (2015.04)

(58) Field of Classification Search
CPC ....... F04D 15/005; F04D 19/00; F04D 21/00; F04D 29/28; F04D 29/284; F04D 29/287; F04D 29/68; F04D 29/681; F04D 29/682; F04D 29/685; F04D 29/522; F04D 29/56; F04D 29/563; F04D 29/40; F04D 29/403; F04D 29/545; F04D 29/547; F04D 29/54; F04D 29/541; F04D 29/542; F05D 2240/302; F05D 2250/25; F05D 2220/10; F01D 5/143; F01D 5/145; F02K 7/005
See application file for complete search history.

(56) References Cited

U.S. PATENT DOCUMENTS

| | | | | |
|---|---|---|---|---|
| 1,883,868 | A * | 10/1932 | Beckeman | 239/548 |
| 2,674,845 | A * | 4/1954 | Pouchot | 60/761 |
| 2,780,436 | A * | 2/1957 | Holzwarth | 239/597 |
| 4,199,296 | A * | 4/1980 | de Chair | 415/181 |
| 4,620,679 | A * | 11/1986 | Karanian | 244/53 B |
| 5,709,076 | A * | 1/1998 | Lawlor | 60/39.35 |
| 6,280,139 | B1 * | 8/2001 | Romani et al. | 415/207 |
| 6,446,425 | B1 * | 9/2002 | Lawlor | 60/768 |
| 7,293,955 | B2 * | 11/2007 | Lawlor et al. | 415/90 |

(Continued)

*Primary Examiner* — Nathaniel Wiehe  
*Assistant Examiner* — Eldon Brockman  
(74) *Attorney, Agent, or Firm* — Edmonds & Nolte, PC

(57) ABSTRACT

A supersonic compressor including a rotor to deliver a gas at supersonic conditions to a diffuser. The diffuser includes a plurality of aerodynamic ducts that have converging and diverging portions, for deceleration of gas to subsonic conditions and then for expansion of subsonic gas, to change kinetic energy of the gas to static pressure. The aerodynamic ducts include vortex generating structures for controlling boundary layer, and structures for changing the effective contraction ratio to enable starting even when the aerodynamic ducts are designed for high pressure ratios, and structures for boundary layer control. In an embodiment, aerodynamic ducts are provided having an aspect ratio of in excess of two to one, when viewed in cross-section orthogonal to flow direction at an entrance to the aerodynamic duct.

36 Claims, 21 Drawing Sheets

(56) References Cited

U.S. PATENT DOCUMENTS

| | | | |
|---|---|---|---|
| 7,334,990 B2 * | 2/2008 | Lawlor et al. | 416/20 R |
| 7,337,606 B2 * | 3/2008 | Brouillette et al. | 60/39.35 |
| 7,434,400 B2 * | 10/2008 | Lawlor et al. | 60/726 |
| 7,594,403 B2 * | 9/2009 | Cadieux | 60/785 |
| 7,685,824 B2 * | 3/2010 | Dahm | 60/767 |
| 8,021,106 B2 * | 9/2011 | Battig | F01D 17/165 415/160 |
| 8,152,439 B2 * | 4/2012 | Lawlor | 415/1 |
| 8,162,604 B2 * | 4/2012 | Kuhnel et al. | 415/211.1 |
| 8,371,324 B1 * | 2/2013 | Fink | 137/15.1 |
| 8,500,391 B1 * | 8/2013 | Lawlor | 415/58.4 |
| 8,770,929 B2 * | 7/2014 | Hofer | F04D 19/024 415/181 |
| 2004/0020185 A1 * | 2/2004 | Brouillette et al. | 60/39.35 |
| 2005/0271500 A1 * | 12/2005 | Lawlor et al. | 415/1 |
| 2006/0021353 A1 * | 2/2006 | Lawlor et al. | 60/772 |
| 2006/0034691 A1 * | 2/2006 | Lawlor et al. | 416/20 R |
| 2007/0056290 A1 * | 3/2007 | Dahm | 60/767 |
| 2007/0274826 A1 * | 11/2007 | Kuhnel et al. | 415/191 |
| 2009/0196731 A1 * | 8/2009 | Lawlor | 415/1 |
| 2009/0288711 A1 * | 11/2009 | Alvi | 137/1 |
| 2012/0156015 A1 * | 6/2012 | Devi et al. | 415/181 |
| 2013/0223975 A1 * | 8/2013 | Lawlor | 415/1 |

* cited by examiner

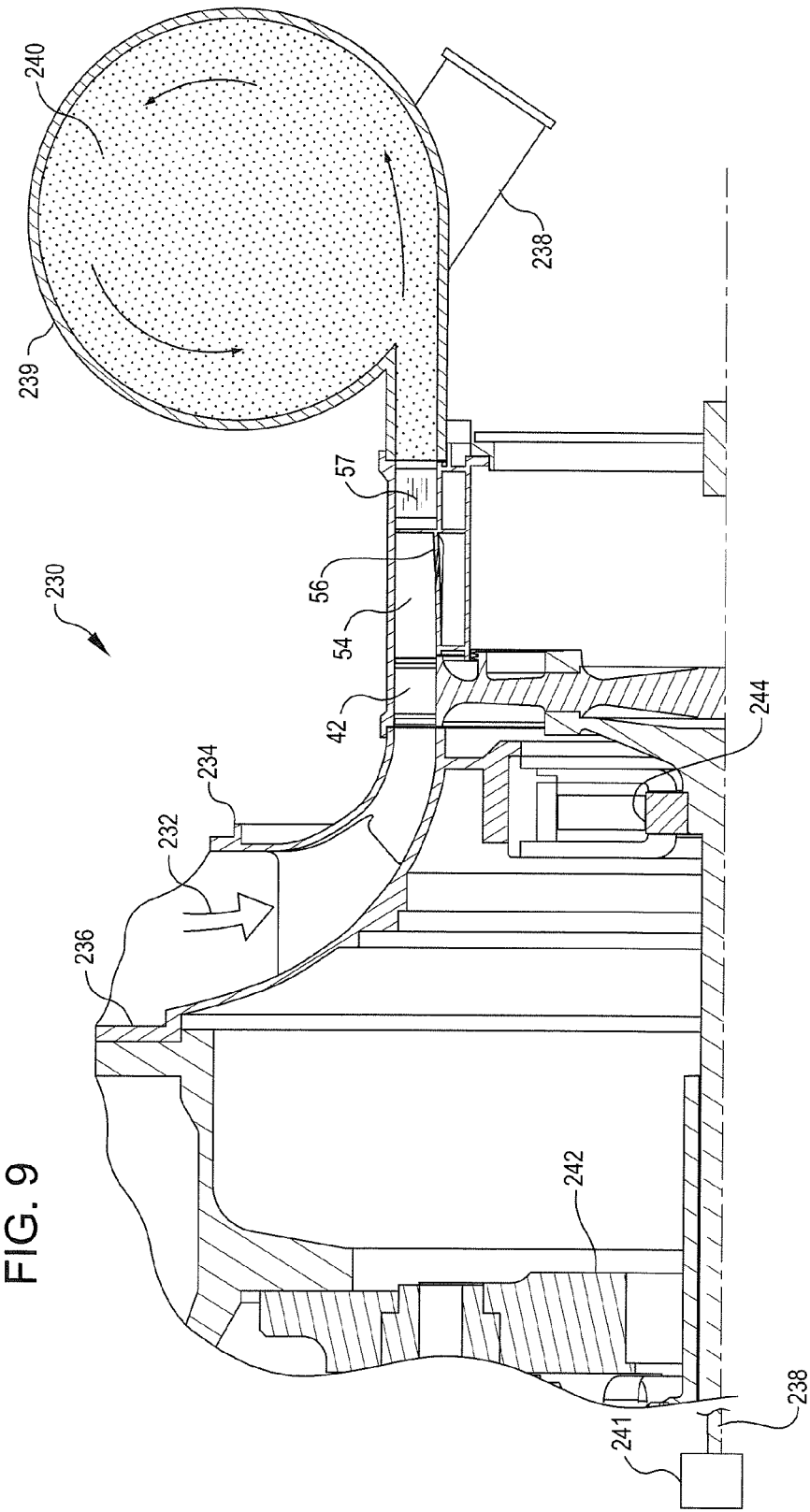

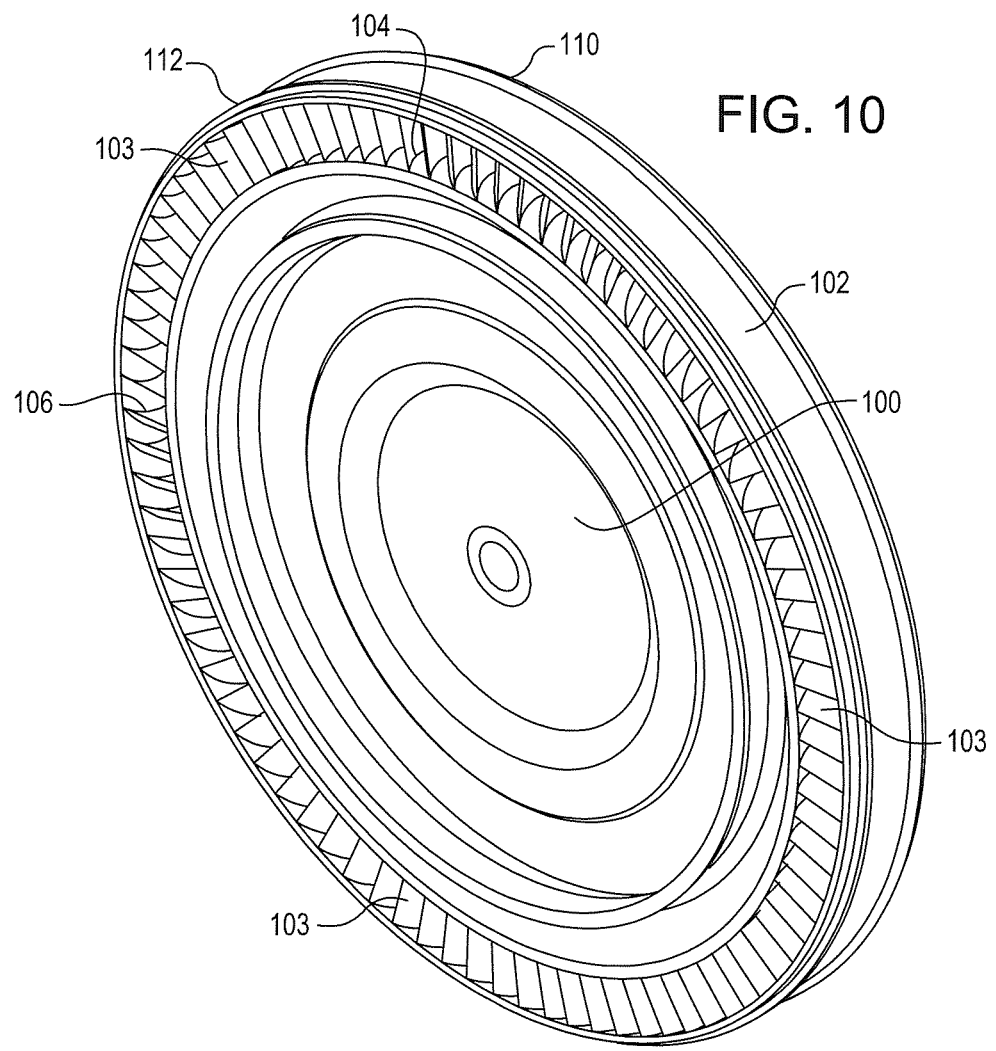

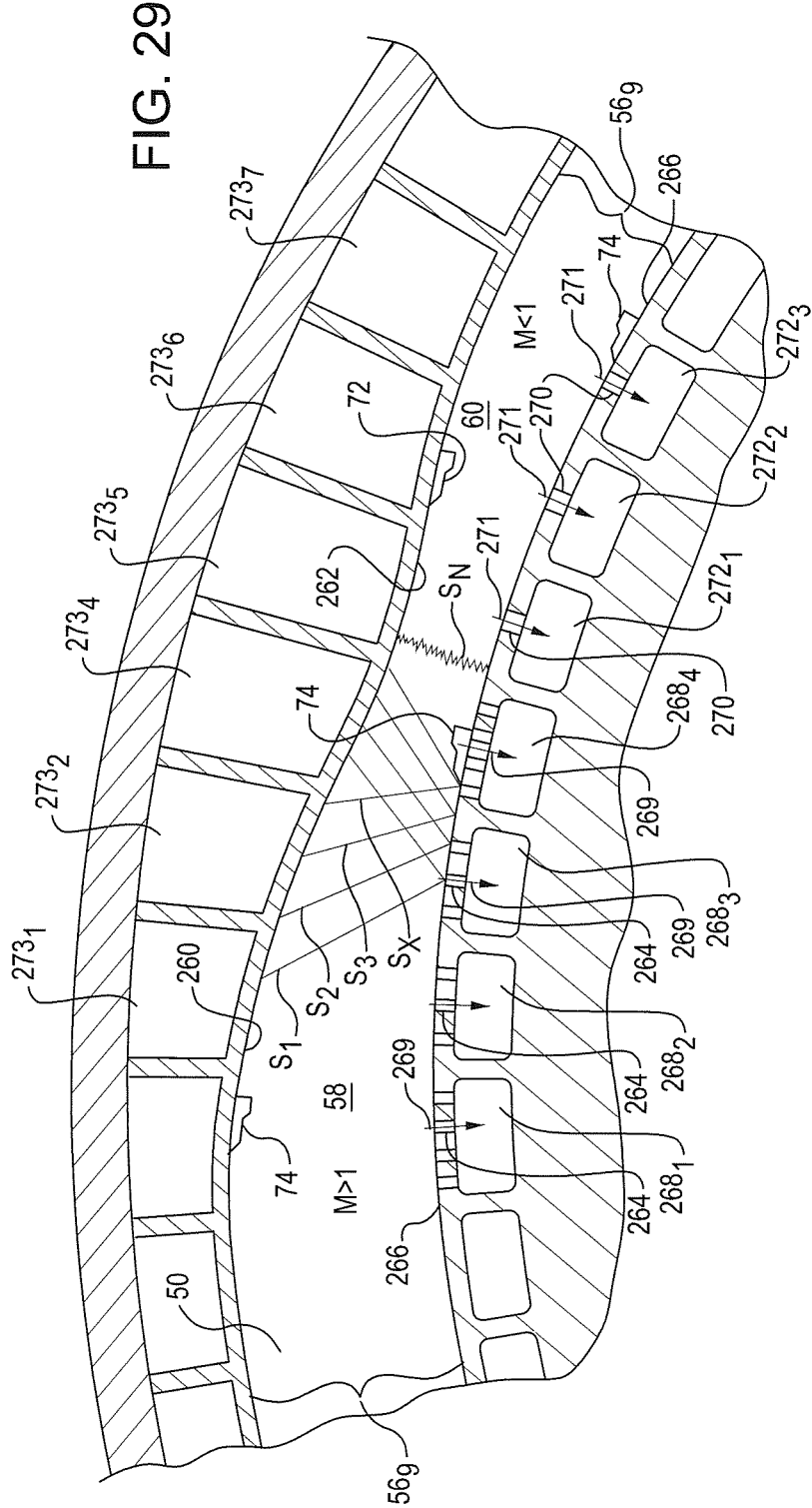

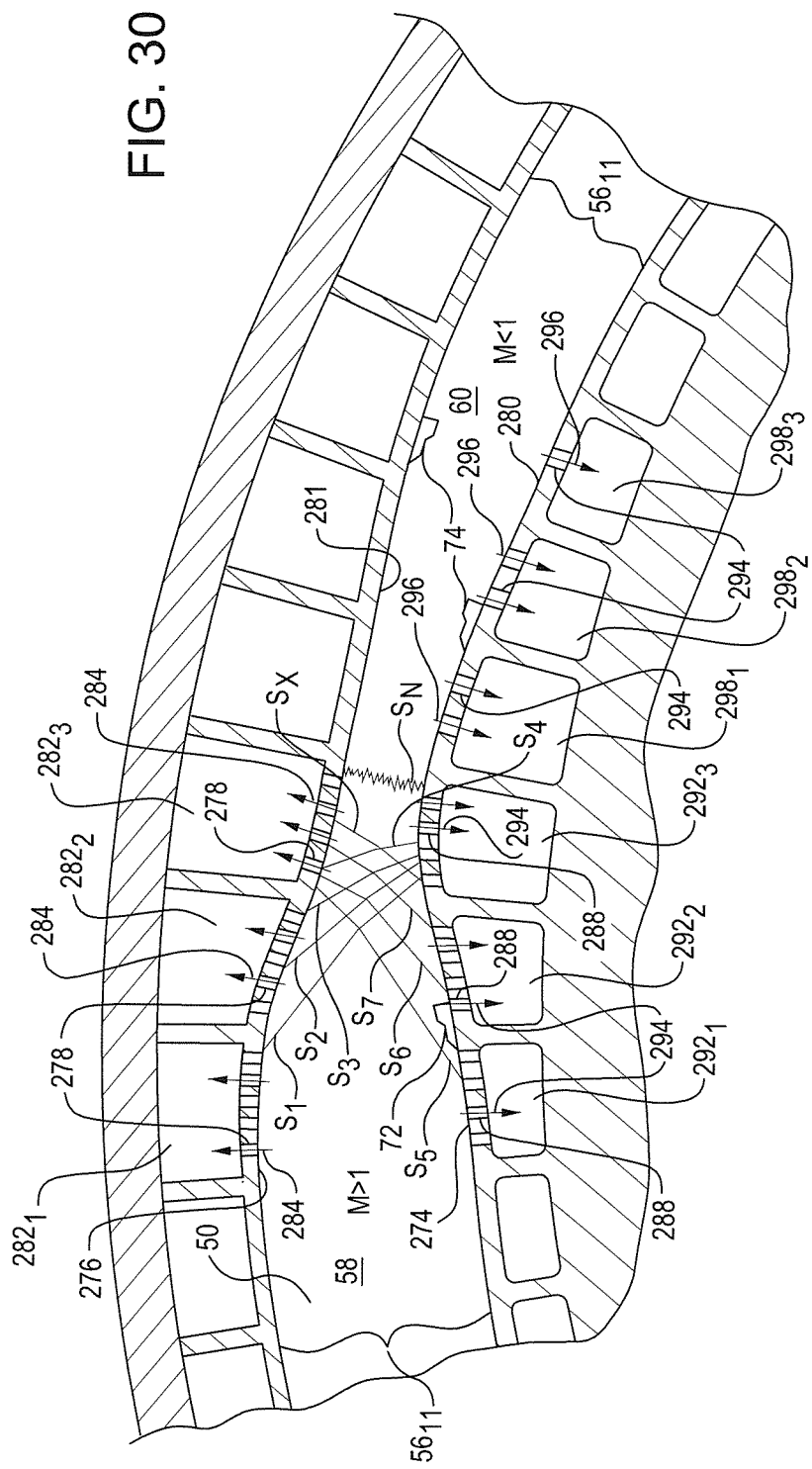

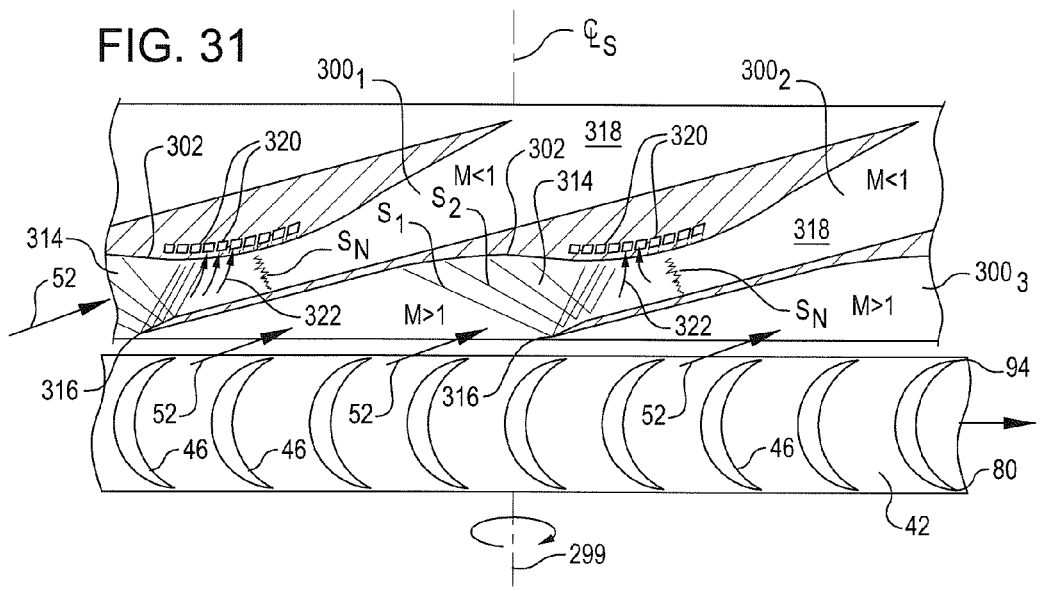
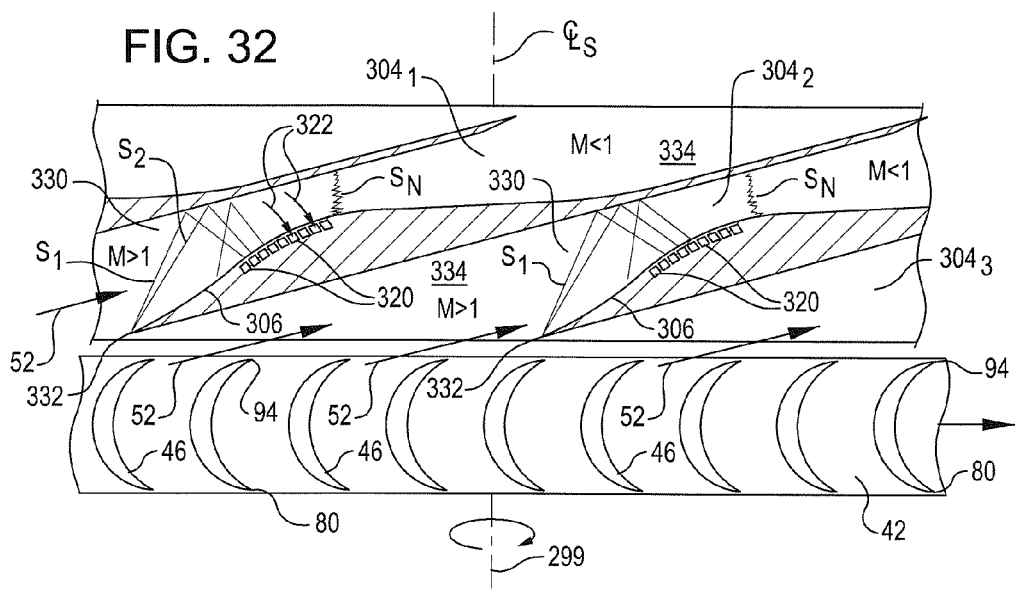

SUPERSONIC COMPRESSOR

CROSS-REFERENCE TO RELATED APPLICATIONS

This application claims priority from prior U.S. Provisional Patent Application Ser. No. 61/506,055, for a SUPERSONIC COMPRESSOR, filed Jul. 9, 2011, the contents of which are incorporated herein by this reference. This application cross-references U.S. Non-Provisional patent application Ser. No. 13/542,673 entitled VORTEX GENERATORS, filed of even date, namely Jul. 6, 2012, the contents of which are incorporated herein by this reference.

STATEMENT OF GOVERNMENT INTEREST

This invention was made with United States Government support under Contract No. DE-FE0000493 awarded by the United States Department of Energy. The United States Government has certain rights in the invention.

COPYRIGHT RIGHTS IN THE DRAWING

A portion of the disclosure of this patent document contains material that is subject to copyright protection. The applicant has no objection to the facsimile reproduction by anyone of the patent document or the patent disclosure, as it appears in the Patent and Trademark Office patent file or records, but otherwise reserves all copyright rights whatsoever.

TECHNICAL FIELD

This description relates to apparatus and methods for the compression of gases, and more particularly to gas compressors which are designed to utilize supersonic shock compression.

BACKGROUND

A continuing interest exists in industry for a simple, highly efficient gas compressor. Such devices may be useful in a variety of applications. Operational costs could be substantially improved in many applications by adoption of a compressor that provides improvements in operating efficiency as compared to prior art compressor designs. Further, from the point of view of maintenance costs, it would be desirable to develop new compressor designs that reduce the mass of rotating components, since rotating components have generally been identified as comparatively costly when replacement or repair becomes necessary, as compared to non-rotating parts which are subject to stress and strain from temperature and pressure, but not to additional loads due to rotary motion. Thus, it can be appreciated that it would be advantageous to provide a new, high efficiency compressor design which minimizes moving parts.

Although a variety of supersonic compressors have been contemplated, and some have been tested by others, the work of J. K. Koffel et al. as reflected in U.S. Pat. No. 2,974,858, issued Mar. 14, 1961, and entitled "High Pressure Ratio Axial Flow Supersonic Compressor," the disclosure of which is incorporated herein in its entirety by this reference, is instructive of such work generally, and thus is suggestive of technical problems that remain in the field and with respect to which better solutions are required in order to improve operational capability and compression efficiency. Although the Koffel et al. patent describes the use of an impulse blade rotor and illustrates a downstream bladed stator, the compressor geometry described would appear, maximally, to only enable achievement of pressure ratios stated therein, which are at one point mentioned as an "... overall pressure ratio of approximately 4 to 1 in a single rotor-stator stage." And, although the Koffel et al. patent mentions issues with respect to boundary layer effects, it does not provide for integrated control of such phenomenon as may be useful to avoid perturbations caused by boundary layer interaction with shock waves, especially as might be applied for compressor operation at higher pressure ratios than those noted therein.

In short, there remains a need to provide a design for a high pressure ratio supersonic compressor that simultaneously resolves various practical problems, including (a) providing for starting of a compressor designed for high pressure ratio operation so as to control a normal shock at an effective location in a supersonic diffuser designed for high pressure ratio and efficient compression, (b) avoiding excessive numbers of leading edge structures (such as may be encountered in prior art multi-bladed stators), and minimizing other losses encountered by a high velocity supersonic gas flow stream upon entering a diffuser, and (c) providing for effective boundary layer control, especially as related to retention of a normal shock at a desirable location, in order to achieve high compression ratios in an efficient manner.

SUMMARY

A novel supersonic compressor has been developed that, in an embodiment, minimizes the number of rotating parts. The compressor utilizes a rotor having a plurality of blades extending into a gas flow passage to develop gas velocity in an incoming gas flow stream, and to accelerate the incoming gas flow stream tangentially and axially, to deliver a gas flow stream at supersonic conditions to a diffuser that includes one or more aerodynamic ducts. In an embodiment, a plurality of blades are provided as impulse blades, in that they provide kinetic energy to increase gas velocity to supersonic conditions, with little if any static pressure rise. In an embodiment, the number of aerodynamic ducts is minimized. As a result, a small number of inlets (at least one inlet being associated with each aerodynamic duct) may be utilized, rather than a large number of stator blades. In an embodiment, an exemplary design minimizes the total number of leading edges, and thus the length of leading edges exposed to the incoming supersonic gas flow is minimized. In an embodiment, the aerodynamic ducts of the diffuser may be wrapped about a surface of revolution that extends along a longitudinal axis, for example, on a cylindrical shape or partial conical shape. In an embodiment, aerodynamic ducts may be provided in a helical or helicoidal configuration. In an embodiment, the aerodynamic ducts may be provided in a shape having a relatively constant helical angle. In an embodiment, the aerodynamic ducts may be provided along a centerline in the general configuration of a circular helix, in that the ratio of curvature to torsion is constant. Other helical shapes may be provided, including shapes with differing ratios of curvature to torsion. Without limitation, various examples are provided herein. For example, in an embodiment, aerodynamic ducts may be provided in a conic helix configuration, in the form of a slight spiral as if located over an underlying conic surface. In various embodiments, aerodynamic ducts may be either right handed or left handed, with inlets and throats oriented substantially with the direction of high pressure supersonic gas leaving the blades of a rotor. Other embodiments may utilize other shapes (for example, non-helical or other shapes) for aerodynamic ducts, and thus the suggested shapes described herein are merely for explanation, without limitation thereby. A series of oblique shocks and a normal shock may be utilized within the aerodynamic ducts to efficiently transform the high velocity incoming supersonic gas flow to a high pressure subsonic gas flow. Subsequent to a first stationary diffuser, gas velocity may be further reduced and static pressure may be accumulated by volute or other suitable structure known in the art. Alternately, a second compression stage may be utilized. In an embodiment, a second compression stage may accept as inlet gas the compressed gas output from a first compression stage. The second compression stage may have a second rotor with a plurality of blades extending into a gas flow passage, and a second stator including further aerodynamic ducts, in order to further compress gas after it leaves a first compression stage. And further stages of compression (e.g., in excess of two stages), may be utilized for yet higher overall compression ratios for particular applications.

For starting supersonic shocks, in an embodiment, a diffuser may include bypass gas outlets for removal of a portion of the incoming gas flow to an extent that facilitates the establishment of supersonic shocks within the diffuser, consistent with a design point for a selected compression ratio, inlet Mach number, and mass flow of a selected gas. In an embodiment, the bypass gas outlets may be utilized for recycle of a portion of incoming gas, for passage through blades of the rotor, and thence back to an inlet for the aerodynamic ducts. In an embodiment, particularly for compression of air, the bypass gas may be simply discharged to the atmosphere. In an embodiment, the gas compressor may provide geometrically adjustable portions in aerodynamic ducts, to change the quantity of incoming gas flow through the diffuser, in order to start and establish stable supersonic shock operation. In an embodiment, both starting bypass gas outlets and geometrically adjustable portions may be utilized.

For minimization of adverse aerodynamic effects, and for improving efficiency of gas flow through a diffuser, one or more boundary layer control structures may be utilized. Such boundary layer control structures may be selected from one or more types of boundary layer control techniques, including removal of a portion of gas flow via boundary layer extraction or bleed, or by energizing a boundary layer by boundary layer gas injection, or by energizing a boundary layer by mixing, such as by use of vortex generators. In an embodiment, the vortex generators may generate multiple vortices, wherein a larger vortex rotates a simultaneously generated, adjacent, and smaller vortex toward and thence into a boundary layer, and thus controls such boundary layer as the smaller vortex mixes with the boundary layer.

In an embodiment, the compressor described herein may have multiple gas paths, that is, multiple aerodynamic ducts, for generating supersonic shock waves and for allowing subsonic diffusion downstream of a throat portion. Since, in an embodiment, supersonic shocks may be located within stationary structures, such as along a stationary ramp portion of an aerodynamic duct, the control of shock location is greatly simplified, as compared to various prior art supersonic compressor designs where shocks are located between structures in rotors, or between rotors and adjacent stationary structures such as circumferential walls.

Further, the location of shocks within stationary diffusers avoids parasitic losses that are present in prior art designs due to drag resulting from the rotational movement of various rotor components. More fundamentally, an embodiment of the compressor design disclosed herein develops high compression ratios with very few aerodynamic leading edge structures, particularly stationary structures, protruding into the supersonic flow path. In part, such improvement is achieved because a design is provided in which the number of aerodynamic ducts is minimized. In an embodiment, only a single leading edge is provided per aerodynamic duct, and thus the number of leading edge surfaces interposed into a supersonic gas flow stream is minimized. Consequently, the compressor design(s) disclosed herein have the potential to provide highly efficient gas compressors, as compared to heretofore known gas compressors, especially when operating at high compression ratios in a single compression stage. For example, and without limitation, the compressor designs disclosed herein may operate at compression ratios in a single stage of up to about four to one (4:1), or at least about four to one (4:1), or at least about six to one (6:1), or from between about six to one to about ten to one (about 6:1 to about 10:1), or up to about twelve and one-half to one (12.5:1), or higher than twelve to one (12:1).

Finally, many variations in gas flow configurations, particularly in detailed rotor geometry and in detailed diffuser geometry, may be made by those skilled in the art and to whom this specification is directed, without departing from the teachings hereof.

BRIEF DESCRIPTION OF THE DRAWINGS

Configurations for novel supersonic compressors will be described by way of exemplary embodiments, using for illustration the accompanying drawing figures in which like reference numerals denote like elements, and in which:

FIG. 1 also shows an embodiment for a diffuser in which the throat of the aerodynamic duct is in close alignment with the direction of gas flow leaving the rotor blades.

FIG. 9 is a vertical cross-section of an embodiment for a compressor, showing a gas passageway for incoming gas to be compressed, and a diffuser including a stationary aerodynamic duct with converging and diverging portions, and a volute for deceleration of gas and accumulation of static pressure, as well as an associated gearbox and motor.

FIG. 10 is a perspective view of an embodiment for an impulse rotor, similar to that seen in FIG. 3 above, but now showing the use of an impulse rotor having a shroud for the blades, and in this embodiment, also showing teeth for a labyrinth-type seal structure on the circumferential portions of the rotor shroud.

FIG. 29 is a cross sectional view along the centerline of a generally helicoidal aerodynamic duct in a diffuser, wherein a compression ramp is located on an outward surface, showing an embodiment wherein bypass gas passageways for starting and establishing stable operation of the shock wave structure are located on an inward surface of the aerodynamic duct, and also showing a plurality of oblique shock structures $S_1, S_2, S_3$, and $S_x$, as well as a normal shock $S_N$, and the use of vortex generators to control a boundary layer adjacent an interior surface of the aerodynamic duct.

FIG. 30 is a cross-sectional view along the centerline of a generally helicoidal aerodynamic duct in a diffuser, wherein a compression ramp is located on both an outward surface and on an inward surface, and showing an embodiment wherein bypass gas passageways for starting and establishing stable operation of the shock wave structure are located on both the outward surface and the inward surface of the aerodynamic duct, and also showing a plurality of oblique shock structures $S_1, S_2, S_3, S_4, S_5, S_6, S_7$, and $S_x$, as well as a normal shock $S_N$, and the use of vortex generators to control a boundary layer adjacent an interior surface of the aerodynamic duct.

FIG. 31 is partial circumferential view showing the longitudinal centerline of a diffuser, and the generally helical aerodynamic ducts used therein, as well as the accompanying rotor and its rotational centerline, showing an embodiment wherein a compression ramp is located on an outwardly extending trailing edge surface, and wherein bypass gas passageways for starting and establishing stable operation of the shock wave(s) are located on the converging compression ramp surface, and also showing a plurality of oblique shock structures $S_1, S_2, S_3$, and $S_x$, as well as a normal shock $S_N$.

FIG. 32 is partial circumferential view showing the longitudinal centerline of a diffuser, and the generally helical aerodynamic ducts used therein, as well as the accompanying rotor and its rotational centerline, showing an embodiment wherein a compression ramp is located on an inward leading edge surface, and wherein bleed air passageways for starting are located on the converging compression ramp surface, and also showing a plurality of oblique shock structures $S_1, S_2, S_3$, and $S_x$, as well as a normal shock $S_N$.

Figure 1:
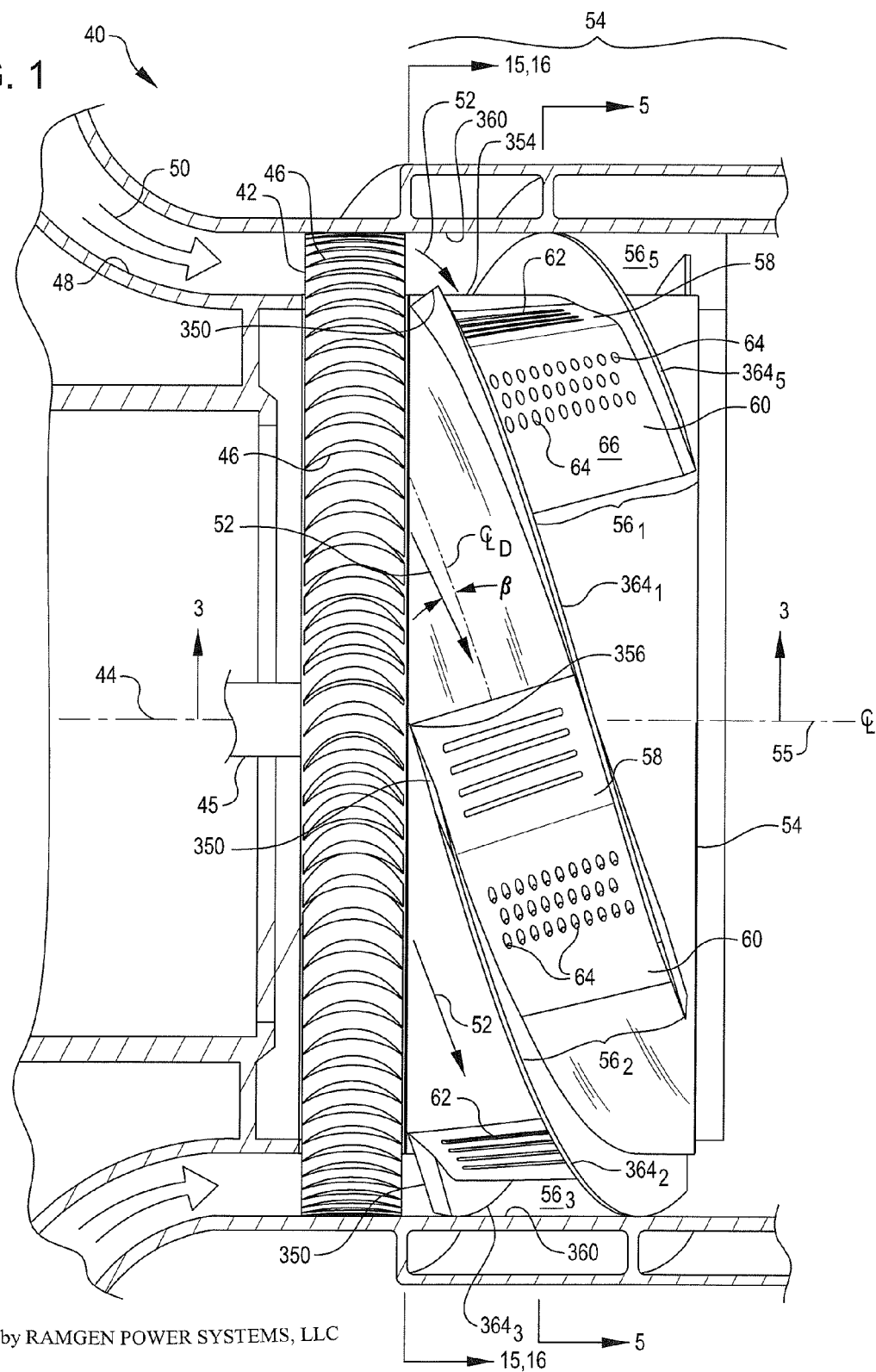
FIG. 1 is a partially cut-away vertical view, showing, in cross-section, an inlet passageway feeding a gas supply to impulse blades on a rotor (shown from the side to reveal exposed blades). The impulse blades deliver gas at supersonic conditions to a stationary diffuser having a plurality of aerodynamic ducts. The aerodynamic ducts include converging and diverging portions, inlet bypass gas passageways for starting, and boundary layer outlet bleed ports for boundary layer control.

The foregoing figures, being merely exemplary, contain various elements that may be present or omitted from actual supersonic compressor designs utilizing the principles taught herein, or that may be implemented in various applications for such compressors. Other compressor designs may use slightly different aerodynamic structures, mechanical arrangements, or process flow configurations, and yet employ the principles described herein or depicted in the drawing figures provided. An attempt has been made to draw the figures in a way that illustrates at least those elements that are significant for an understanding of an exemplary supersonic compressor design. Such details should be useful for providing an efficient supersonic compressor design for use in industrial systems.

It should be understood that various features may be utilized in accord with the teachings hereof, as may be useful in different embodiments as necessary or useful for various gas compression applications, depending upon the conditions of service, such as temperatures and pressures of gas being processed, within the scope and coverage of the teaching herein as defined by the claims.

DETAILED DESCRIPTION

The following detailed description, and the accompanying figures of the drawing to which it refers, are provided describing and illustrating some examples and specific embodiments of various aspects of the invention(s) set forth herein, and are not for the purpose of exhaustively describing all possible embodiments and examples of various aspects of the invention(s) described and claimed below. Thus, this detailed description does not and should not be construed in any way to limit the scope of the invention(s) claimed in this or in any related application or resultant patent.

To facilitate the understanding of the subject matter disclosed herein, a number of terms, abbreviations or other shorthand nomenclature are used as set forth herein below. Such definitions are intended only to complement the usage common to those of skill in the art. Any term, abbreviation, or shorthand nomenclature not otherwise defined shall be understood to have the ordinary meaning as used by those skilled artisans contemporaneous with the first filing of this document.

In this disclosure, the term "aerodynamic" should be understood to include not only the handling of air, but also the handling of other gases within the compression and related equipment otherwise described. Thus, more broadly, the term "aerodynamic" should be considered herein to include gas dynamic principles for gases other than air. For example, various relatively pure gases, or a variety of mixtures of gaseous elements and/or compounds, may be compressed using the apparatus described, and thus as applicable the term "aerodynamic duct" shall also include the compression of gases or gas mixtures other than air, in what may be considered a gas dynamic duct.

The term "diffuser" may be used to describe an apparatus designed to reduce the velocity and increase the pressure of a gas entering at supersonic velocity. A diffuser may employ one or more aerodynamic ducts, which, when multiple aerodynamic ducts are used, divide the incoming gas into smaller flows for processing. Such aerodynamic ducts in a diffuser may include (a) a supersonic diffuser portion, which may be in the form of a converging portion generally of decreasing cross-sectional area and which receives gas at supersonic velocity and creates oblique shocks, (b) a throat portion, at or in which in a minimal throat cross-sectional area is provided, and (c) a subsonic diffuser portion, which may be in the form of a diverging portion of increasing cross-section toward a final subsonic diffuser cross-sectional area and which allows kinetic energy from gas velocity to be converted into static pressure of the gas.

The term "impulse blade(s)" may be used to describe blades used to accelerate the flow of gas having a characteristic geometry wherein kinetic energy is imparted to the gas passing therethrough, and at a theoretical limit, no pressure increase is imparted to the gas passing therethrough. Thus, in impulse blades as described herein, work done on a gas flow by impulse blades results predominantly in an increase in velocity, rather than predominantly in an increase in pressure. The velocity increase of a gas flow through impulse blades is achieved by change of direction of the gas flow.

The term "inlet" may be used herein to define an opening designed for receiving fluid flow, and more specifically, the flow of gas. For example, in an aerodynamic duct for a diffuser of a supersonic compressor, the aerodynamic duct has an inlet having an inlet cross-sectional area that is shaped to capture and ingest gas to be compressed. Inlets may have a large variety of shapes, and a few exemplary shapes are provided herein.

The term "startup" may be used to define the process of initiating gas flow and achieving stable supersonic flow of gas through a converging portion, and into at least some of a diverging portion of generally increasing cross-sectional area extending downstream from a throat of an aerodynamic duct. More specifically, startup is the achievement of a condition wherein shock waves defining the boundary between supersonic and subsonic conditions of gas flow are stabilized at a desired location in an aerodynamic duct, given the mass flow, inlet Mach number, and pressure ratio for a gas being compressed. In general, various structures and/or systems as described herein may be used for startup—in order to conduct the process of initiating operation and establishing a stable shock system in aerodynamic ducts. In various embodiments, variable geometry inlets may be provided, allowing for a shock to be swallowed through a throat in an aerodynamic duct, to thereby start the aerodynamic duct. In other embodiments, aerodynamic ducts may be configured to allow external discharge of a portion of the gas flow thereto, in order to provide for startup, again by allowing a shock to be swallowed through a throat in an aerodynamic duct. In other embodiments, aerodynamic ducts may be configured to allow a portion of the gas flow thereto to internally bypass the throat. Such gas flow may be reintroduced into a diverging portion of an aerodynamic duct. The reduced gas flow through the throat of an aerodynamic duct allows for starting of the aerodynamic duct. The performance of the aerodynamic ducts when in a startup configuration would be roughly the same as might be found in an aerodynamic duct without adjustable gas flow and having the same effective contraction ratio (in other words, the degree of blockage of the aerodynamic duct) for example, as in a fixed geometry aerodynamic duct. However, once startup is achieved and stable supersonic flow is established, bypass valves, or gates, or other structures employed to provide for bypass of some gas around the converging portion, or to provide reduced throat cross-sectional area, may be closed or returned to an operating position or operating condition. Thereafter, in an operational configuration, a compressor as described herein provides aerodynamic ducts wherein a high pressure ratio recovery is achieved even when a single stage of compression is employed.

The term "un-start condition" may be used herein to describe a flow condition under which gas to be compressed flows through an inlet much less effectively than under compressor design conditions, and wherein some, or even most of entering gas may be rejected from the inlet, instead of being properly ingested for effective operation of the compressor. In various embodiments, during an un-start condition, supersonic flow conditions with stable shocks would not be properly established at their design range locations within an aerodynamic duct.

The term "VGs" may be used to refer to vortex generators.

Turning now to FIG. 1, an exemplary design for a supersonic compressor 40 is illustrated. The compressor 40 may utilize a rotor 42 having an axis of rotation 44, and, for example a driving shaft 45, and a plurality of blades 46 extending into a gas flow passage 48. Blades 46 may be sized and shaped to act on a selected incoming gas 50 to provide a supersonic gas flow 52. A diffuser 54 is provided. In an embodiment, diffuser 54 may be disposed around a longitudinal axis 55 (shown with centerline $C_L$ in FIG. 1) and positioned to receive the supersonic gas flow 52. In an embodiment, the diffuser 54 may be provided as one or more aerodynamic ducts 56. In some of the figures (see FIG. 15, for example), the one or more aerodynamic ducts 56 may be individually further identified with a subscript as a first aerodynamic duct $56_1$, a second aerodynamic duct $56_2$, a third aerodynamic duct $56_3$, a fourth aerodynamic duct $56_4$ (shown in FIG. 15), a fifth aerodynamic duct $56_5$, and in FIG. 16, a sixth aerodynamic duct $56_6$, and seventh aerodynamic duct $56_7$, are shown for each individual aerodynamic duct 56 that may be utilized in a specific diffuser 54 design. More generally, a number N of aerodynamic ducts 56 and a number B of blades 46 may be provided, with the number B of blades 46 and the number N of aerodynamic ducts 56 being unequal, in order to avoid adverse harmonic effects. While in various prior art compressor designs a number B of blades 46 of N minus 1 (N−1) or of N plus one (N+1) has generally been considered acceptable to avoid adverse harmonic effects, it is noted herein that aerodynamic losses are reduced by minimizing the number of aerodynamic ducts 56, and more specifically, by reducing the number of components exposed to a supersonic incoming gas flow stream. Thus, in an embodiment, the number of blades 46 may considerably exceed the number of aerodynamic ducts 56, thereby reducing components exposed to supersonic flow. However any ratio between the number B of blades 46 and the number N of aerodynamic ducts 56 should be selected to avoid adverse harmonic effects.

The aerodynamic ducts 56 each include a converging portion 58 and a diverging portion 60. In an embodiment, rotor 42 may be configured with blades 46 to turn incoming gas 50 to provide a supersonic relative velocity gas flow 52 at a selected exit angle beta (β) relative to the centerline $C_{LD}$ of the one or more downstream aerodynamic ducts 56. In an embodiment, but without limitation, the angle beta (β) may be provided at zero degrees (0°), wherein the direction of gas flow 52 is aligned with the centerline $C_{LD}$ of aerodynamic ducts 56, and thus a unique incidence angle is provided between the direction of the gas flow 52 and the centerline $C_{LD}$ of the one or more downstream aerodynamic ducts 56. In other words, in an embodiment, a unique incidence angle is provided since the direction of gas flow 52 matches the centerline $C_{LD}$ of an aerodynamic duct 56 into which the gas flow 52 occurs. However, it should be understood that configurations which are not so precisely aligned may also be workable, but it must be noted that if the flow exit angle beta (β) is not aligned with respect to the aerodynamic ducts 56, a series of shock waves or expansion fans (depending on whether the relative angle of attack of the incoming flow is positive or negative) will be formed to turn the flow to largely match the flow angle through the aerodynamic ducts 56 along centerline $C_{LD}$. Such shock wave or expansion fan systems will result in total pressure loss which will contribute to a decrease in overall compression efficiency, and reduce the overall compressor ratio achieved for a given speed of blades 46. As an example, a variation in the flow exit (or "incidence") angle beta (β) ranging from about 11.0 to about 8.0 degrees, at inflow Mach numbers of from about 2.0 to about 3.0, respectively, would result in about three (3) percentage points of efficiency loss. Such increased losses and corresponding decreases in stage efficiency may be acceptable in various applications. However, in addition to shock wave or expansion fan conditions resulting in pressure and efficiency loss, adverse shock to boundary layer interaction, and or boundary layer separation issues, may arise as such off-design conditions become more severe, depending upon the strength of the shock wave system and the thickness of the boundary layer system interacting therewith. And, adverse shock wave and accompanying pressure signatures may be expected to reflect from blades 46, especially at the trailing edges thereof, potentially increasing stress and reducing life of blades 46. Consequently, embodiments tending to closely align flow exit angle beta (β) with the centerline $C_{LD}$ of aerodynamic ducts 56 should be considered optimal, although not limiting.

Figure 34:
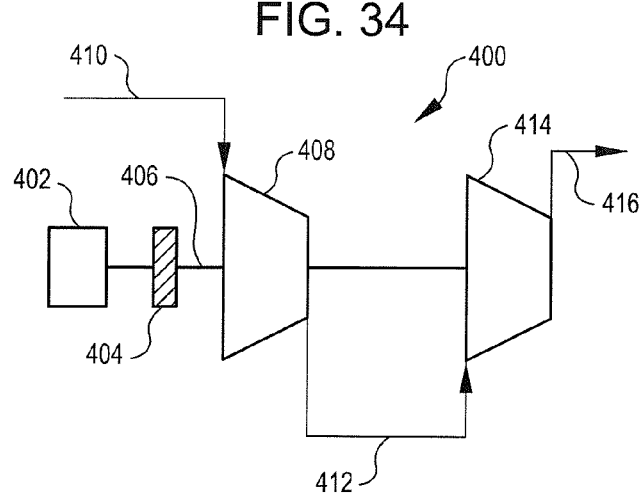
FIG. 34 is diagrammatic flow sheet depicting the use of at least two compression stages, wherein the high pressure gas from a first compressor stage is provided to the low pressure entry of a second compressor stage for further compression.

A rotor 42 and a diffuser 54 together, as depicted in FIG. 1, provide a stage of compression. In those cases where further compression is required, multiple stages of compression may be utilized in order to provide gas at a desired final pressure, for example, as shown in FIG. 34 below.

As shown in FIG. 1, in an embodiment, a diffuser 54 may include therein one or more structures that enable startup of the shock wave, and one or more structures that provide for control of boundary layer drag, as more fully addressed below. In an embodiment, bypass gas passageways 62 are provided to remove a portion of incoming gas flow 52 during startup conditions, so as to adjust the effective contraction ratio of the associated aerodynamic duct 56. In this manner, aerodynamic ducts 56 may be designed for operation at high compression ratios, yet be adapted for startup of a stable supersonic shock system within the aerodynamic duct 56 that ultimately enables transition to high compression ratio operation.

Figure 23:
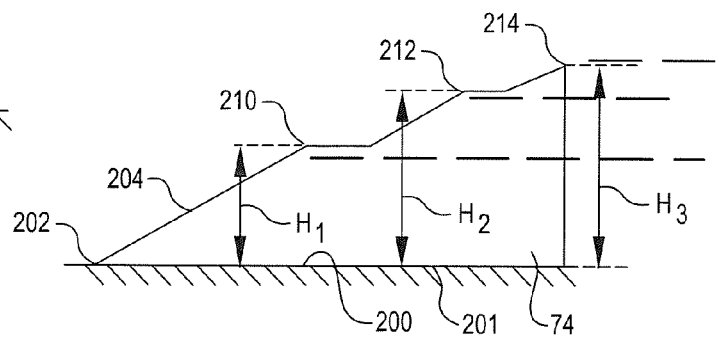
FIG. 23 is a diagrammatic side view for an embodiment for a vortex generator affixed to a selected surface of an aerodynamic duct, wherein the vortex is designed to generate at least one (1) vortex, and here showing the generation of three (3) vortices from an incoming gas flow as indicated by heavy broken lines.
Figure 24:
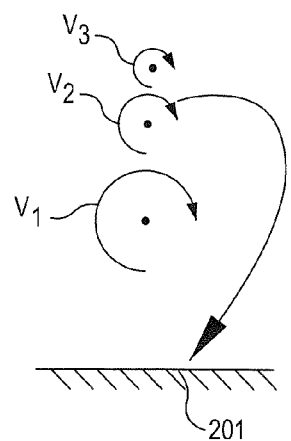
FIG. 24 is a diagrammatic end view for the embodiment of a vortex generator as just illustrated in FIG. 23 above, showing three (3) vortices, a large one, an intermediate sized one, and a small one, as first generated above a selected surface of an aerodynamic duct.
Figure 25:
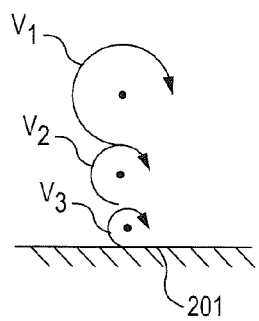
FIG. 25 is a diagrammatic end view for the embodiment of a vortex generator as just illustrated in FIGS. 23 and 24 above, showing three (3) vortices, a large one, an intermediate sized one, and a small one, as they turn and flip the smaller vortices downward against the selected surface of an aerodynamic duct, so as to become located in a position for effecting work on a boundary layer adjacent the selected surface.

In an embodiment, aerodynamic ducts 56 may include one or more boundary layer control structures, such as bleed ports 64 as seen in FIG. 1 for removal of gas from aerodynamic ducts 56 as may be required for control of boundary layer at surface 66 of the aerodynamic duct 56. As further described below, boundary layer control may be provided by one or more other or additional structures, such as via inlet jets 70 for energizing a boundary layer by gas injection (see FIGS. 26 and 27), and/or by vortex generators 72 or 74 (see, for example, FIGS. 20, 23, and 28).

Figure 2:
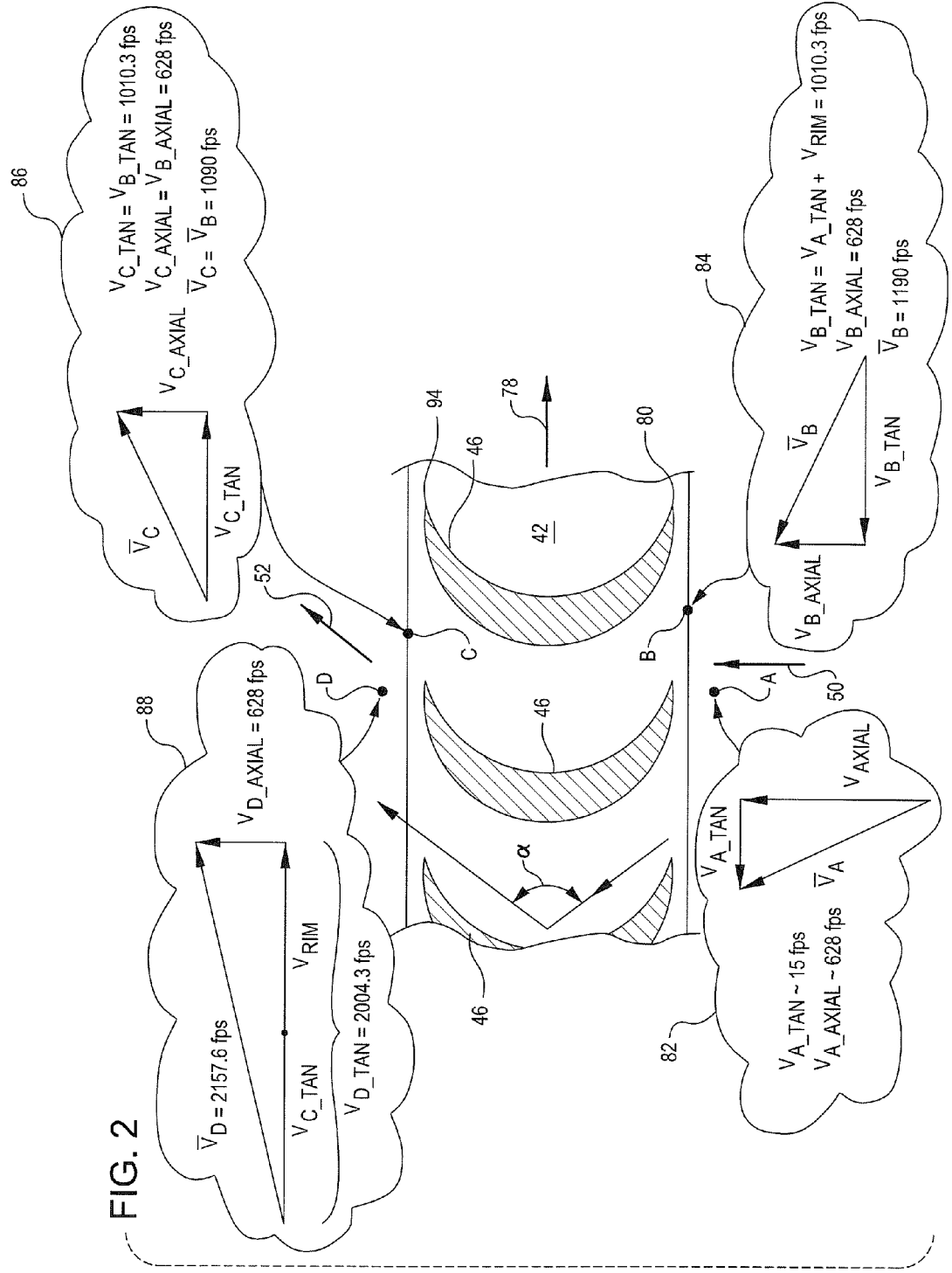
FIG. 2 provides a gas velocity diagram with respect to an exemplary impulse rotor blade design, describing gas velocity components at four different locations relative to blades extending from a rotor.

Turning now to FIG. 2, as an example for a particular design and without limitation, flow conditions are depicted for an embodiment for a design within a selected design envelope for a supersonic compressor. The rotor 42 includes impulse blades 46, moving in the direction indicated by reference arrow 78. The use of impulse blades 46 in rotor 42 enables efficient turning of the flow of an incoming gas, especially when utilizing a rotor 42 having blades 46 with sharp leading edges 80 and sharp trailing edges 94. At location A, upstream of rotor 42, a small tangential velocity (as compared to tangential velocity after exit from rotor 42 as described below) may be encountered prior to the rotor 42, as indicated by the velocity diagram shown in cloud 82. At the entry plane to the rotor 42, i.e. at location B, the gas velocity is accelerated as indicated in the velocity diagram shown in cloud 84. At the exit plane the rotor 42, i.e. at location C, the gas has been partially accelerated and is moving as indicated in the velocity diagram shown in cloud 86. Finally, after exit from rotor 42, at location D, the gas velocity is as indicated in the velocity diagram shown in cloud 88. Basically, an impulse bladed rotor 42 allows a high degree of turning of the incoming gas 50, through an angle alpha (α). Moreover, as seen in the velocity vector diagram set forth in cloud 88, the vector sum of the axial velocity at location D ($V_D$_Axial of about 628 feet per second), the tangential velocity at location D ($V_D$_Tangential of about 2004.3 feet per second), provides an overall relative velocity of gas stream 52 at location D ($V_D$ of about 2157.6 feet per second), which is thus supersonic for gas stream 52 as it enters an aerodynamic duct 56 of diffuser 54. Thus, as seen in FIG. 1, in an embodiment, the desired supersonic velocity of gas stream 52 entering the aerodynamic ducts 56 of diffuser 54 is achieved by a combination of velocity of gas through the blades 46 and the tangential rotation of the rotor 42.

In an embodiment for a supersonic compressor 40 such as illustrated in FIG. 1, the selected inlet gas passing through the blades 46 of the rotor 42 may be turned by an angle alpha (α) of at least ninety (90) degrees. In an embodiment of compressor 40, the selected inlet gas passing through the rotor 42 may be turned by an angle alpha (α) of at least one hundred (100) degrees. In an embodiment of compressor 40, the selected inlet gas passing through the blades 46 of the rotor 42 may be turned by an angle alpha (α) of at least one hundred ten (110) degrees. In an embodiment of compressor 40, the selected inlet gas passing through the blades 46 of the rotor 42 may be turned by an angle alpha (α). The angle alpha (α) may be at least ninety (90) degrees, for example, between about ninety (90) degrees and about one hundred twenty five (125) degrees, or between about ninety (90) degrees and about one hundred sixty (160) degrees, or between about one hundred twelve (112) degrees and about one hundred fourteen (114) degrees. Details of exemplary designs for various impulse type blades for use in supersonic compressors may be found by those of skill in the art from various sources. One helpful reference may include a NASA report entitled "Analytical Investigation of Supersonic Turbomachinery Blading—Section II—Analysis of Impulse Turbine Blade Sections", by Louis J. Goldman, Published as Report No. NASA-TN-D-4422, on Apr. 1, 1968, which is incorporated herein by reference, and to which the reader may refer for additional background in implementing an impulse blade in a supersonic compressor design as further taught herein.

Figure 3:
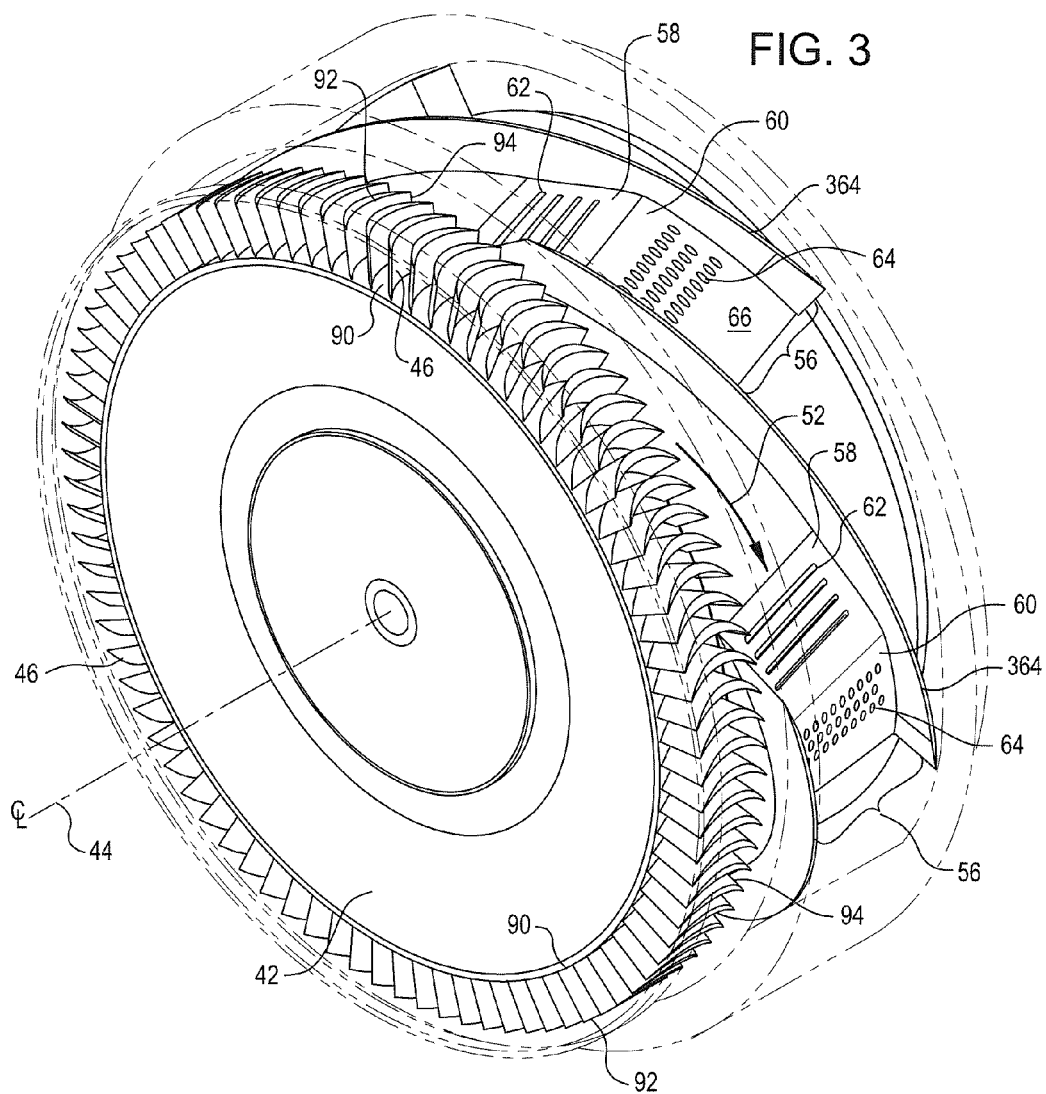
FIG. 3 is a perspective view of impulse blades on a rotor and a downstream stationary diffuser that includes a plurality of aerodynamic ducts, showing a helical structure for the aerodynamic ducts having converging and diverging portions, as well as inlet bypass passageways for starting, and boundary layer ports for boundary layer control, and portions of adjacent static structure in phantom lines.

As shown in FIG. 3, in an embodiment, each of the plurality blades 46 in rotor 42 may have a hub end 90, a tip end 92, and a trailing edge 94. In an embodiment, the blades 46 are provided with supersonic gas flow 52 at their trailing edge 94. In an embodiment, supersonic gas flow at the trailing edge 94 may be from the hub end 90 to the tip end 92 of the trailing edge 94.

Figure 11:
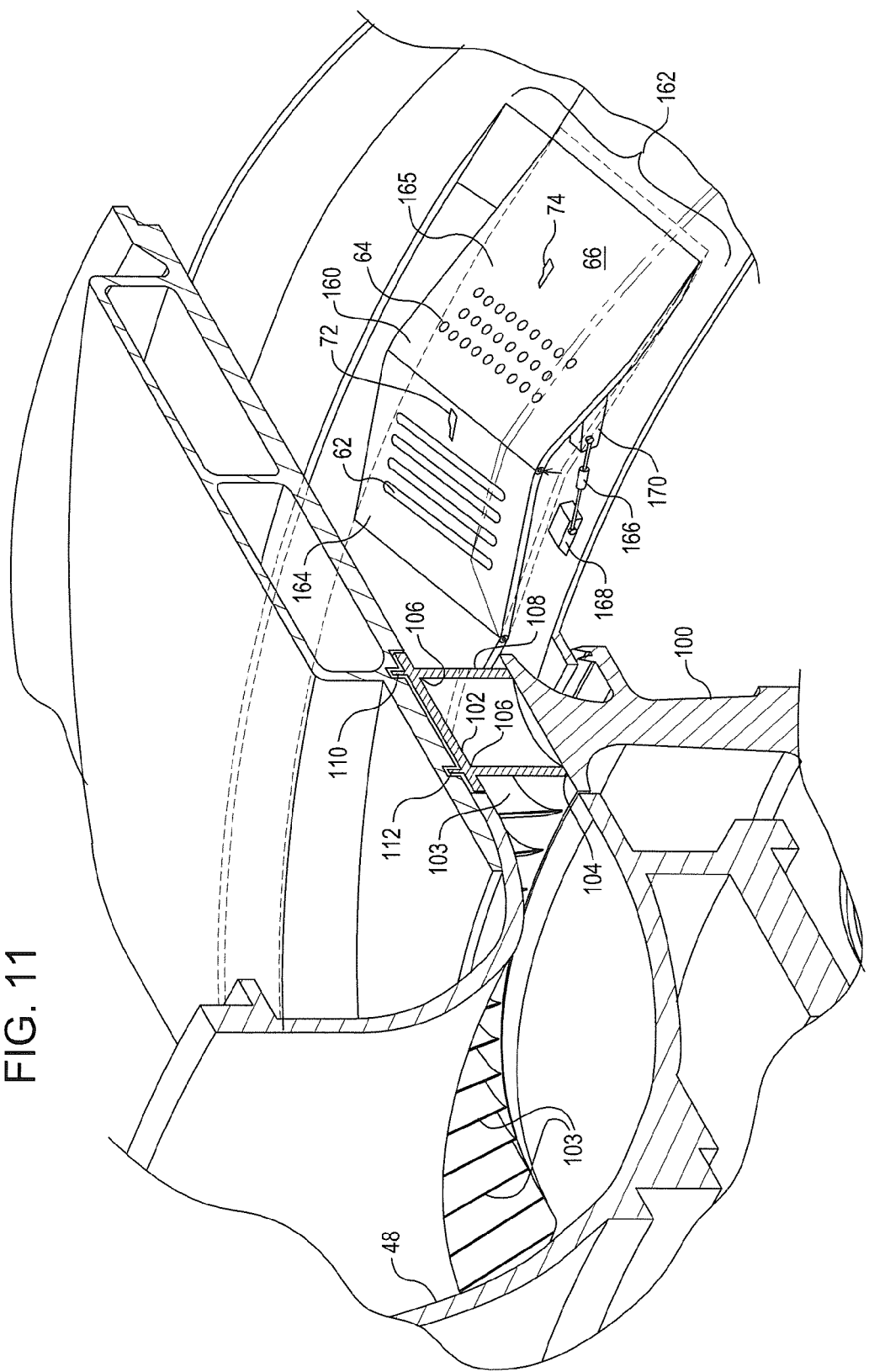
FIG. 11 is a partial cross-sectional view of an embodiment for a compressor, similar to that shown in FIG. 4 above, showing an inlet duct, impulse rotor having a shroud such as just illustrated in FIG. 10, a diffuser including an aerodynamic duct having geometrically adjustable converging and diverging portions and which is adapted for changing the effective contraction ratio of the aerodynamic duct for starting and setting up a supersonic shock wave in a suitable location, and further showing the use of vortex generators for effective control of boundary layer phenomenon.

As shown in FIGS. 10 and 11, in an embodiment, a rotor 100 may be provided having a shroud 102 for blades 103. Such shrouded blades 103 on rotor 100 will be understood by those of skill in the art to be otherwise as just noted above as regards supersonic gas flow on blades 103 from a hub end 104 to a tip end 106 at trailing edge 108. In an embodiment, shroud 102 may include labyrinth seal portions 110 and 112. By use of a labyrinth seal or other suitable seal, such as a honeycomb seal, a dry gas seal, brush seals, etc., the rotor 100 may be effectively sealed with respect to a downstream aerodynamic duct such as duct 162, so as to minimize gas leakage during flow therebetween.

Figure 5:
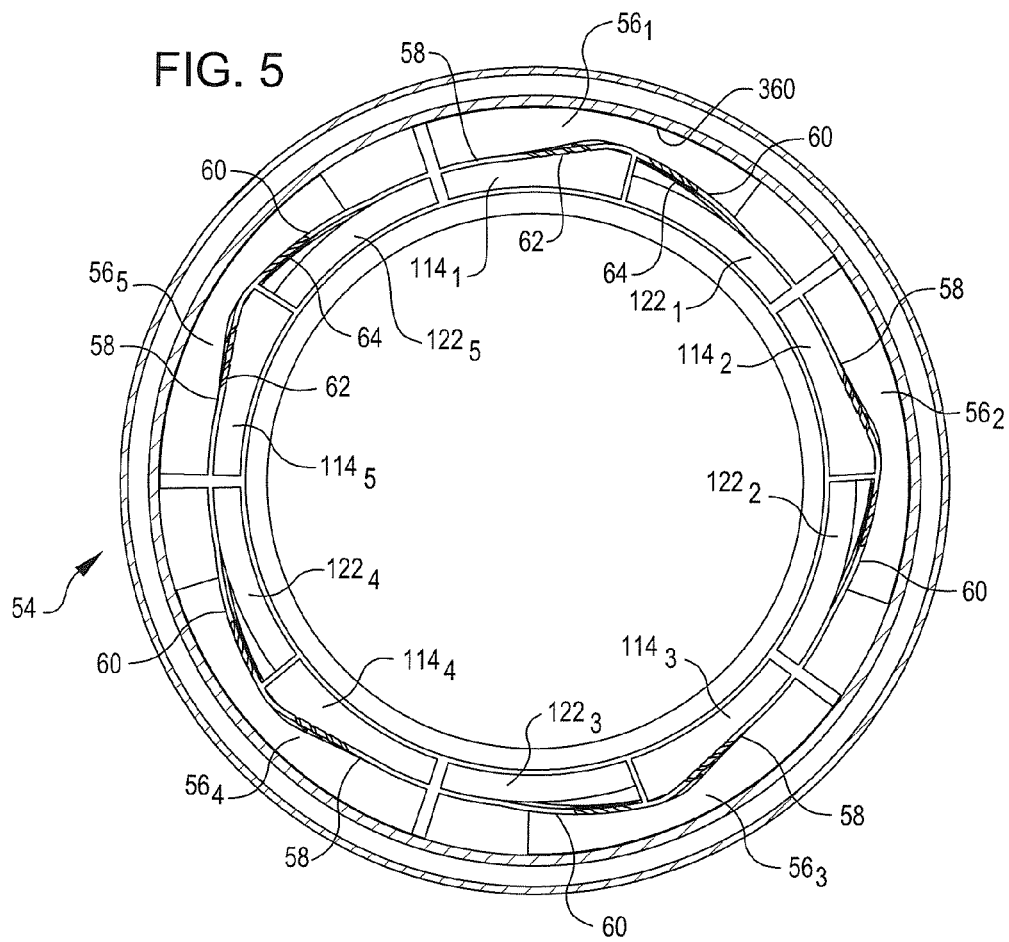
FIG. 5 is a cross-sectional view of a stationary diffuser including the use of five (5) aerodynamic ducts having converging and diverging portions, as well as inlet bypass passageways for starting, and boundary layer bleed ports for boundary layer control, as well as associated sub-chambers and passageways adjacent the converging and diverging portions.
Figure 6:
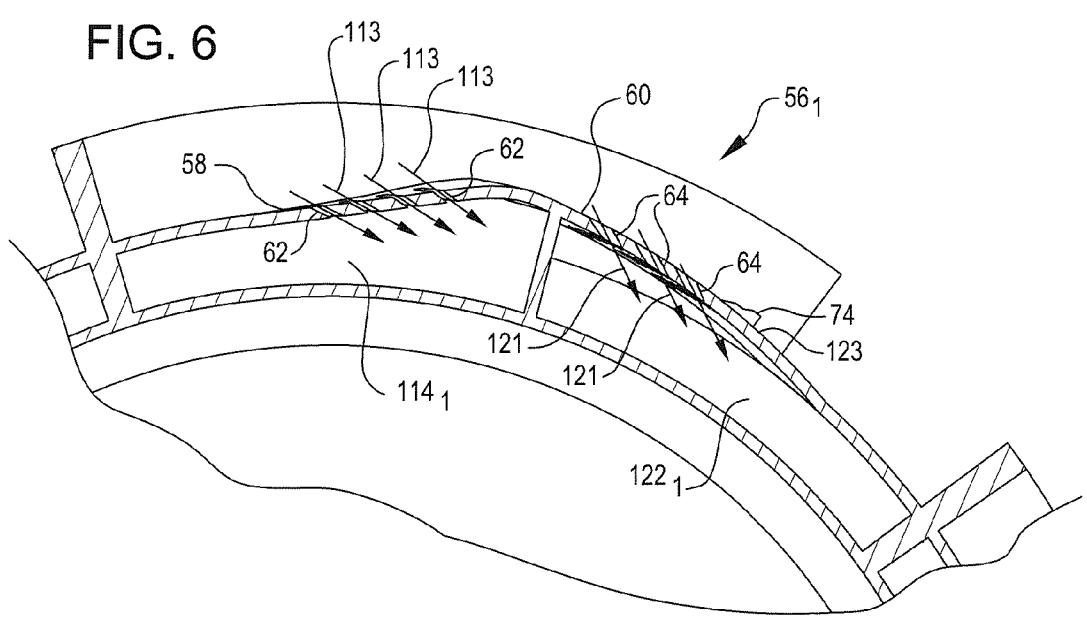
FIG. 6 is an enlarged detail of a portion of an exemplary aerodynamic duct similar to that first depicted in FIG. 5, but now showing the use, in an embodiment, of boundary layer bleed through outlet bleed ports for boundary layer control, and at the same time, the use of vortex generators within the aerodynamic duct for control of a boundary layer by mixing.

A cross-sectional view of a diffuser 54 is shown in FIG. 5, taken across section line 5-5 in FIG. 1. As shown in that embodiment, five (5) aerodynamic ducts are utilized, more specifically aerodynamic ducts $56_1$, $56_2$, $56_3$, $56_4$, and $56_5$, each having a converging portion 58 and a diverging portion 60. Inlet bypass gas passageways 62 are shown, as useful for starting, by removal of discharge gas 113 as functionally illustrated in FIG. 6 and as further discussed below with reference to FIG. 6. As illustrated in FIGS. 5 and 6, sub-chambers $114_1$, $114_2$, $114_3$, $114_4$, and $114_5$ are shown as transport conduits for discharge gas 113 from respective associated aerodynamic ducts $56_1$, $56_2$, $56_3$, $56_4$, and $56_5$. Boundary layer control structures, here provided in the form of boundary layer bleed ports 64, are shown for use in boundary layer control, by removal of bleed gas 121. Boundary layer bleed sub-chambers $122_1$, $122_2$, $122_3$, $122_4$, and $122_5$ are shown as transport conduits for boundary layer bleed gas 121 from respective associated aerodynamic ducts $56_1$, $56_2$, $56_3$, $56_4$, and $56_5$. In general, the sub-chambers $114_1$, $114_2$, $114_3$, $114_4$, and $114_5$ for handling discharge gas 113 and sub-chambers $122_1$, $122_2$, $122_3$, $122_4$, and $122_5$ for handling bleed gas 121 may be located inwardly from their respective aerodynamic ducts 56 from which such discharge gas 113 and bleed gas 121 are removed.

Turning now to FIG. 6, an enlarged detail of a portion of an exemplary aerodynamic duct $56_1$ is illustrated. Here, the use of inlet bypass gas passageways 62 is shown, as useful for removal of discharge gas 113 during starting of the compressor. Also, boundary layer bleed ports 64 are shown for use in boundary layer control by removal of bleed gas 121 to a sub-chamber $122_1$, which control may occur during normal operation, or during starting, or both. Further, an exemplary vortex generator 74 is shown within the aerodynamic duct $56_1$ for control of a boundary layer by mixing the boundary layer flow with higher velocity gas flow more distant from surface 123. Multiple vortex generators, whether of the specific designs described herein, or chosen from one or more vortex generator configurations heretofore known to those of skill in the art, may be utilized as appropriate in any particular design.

Figure 4:
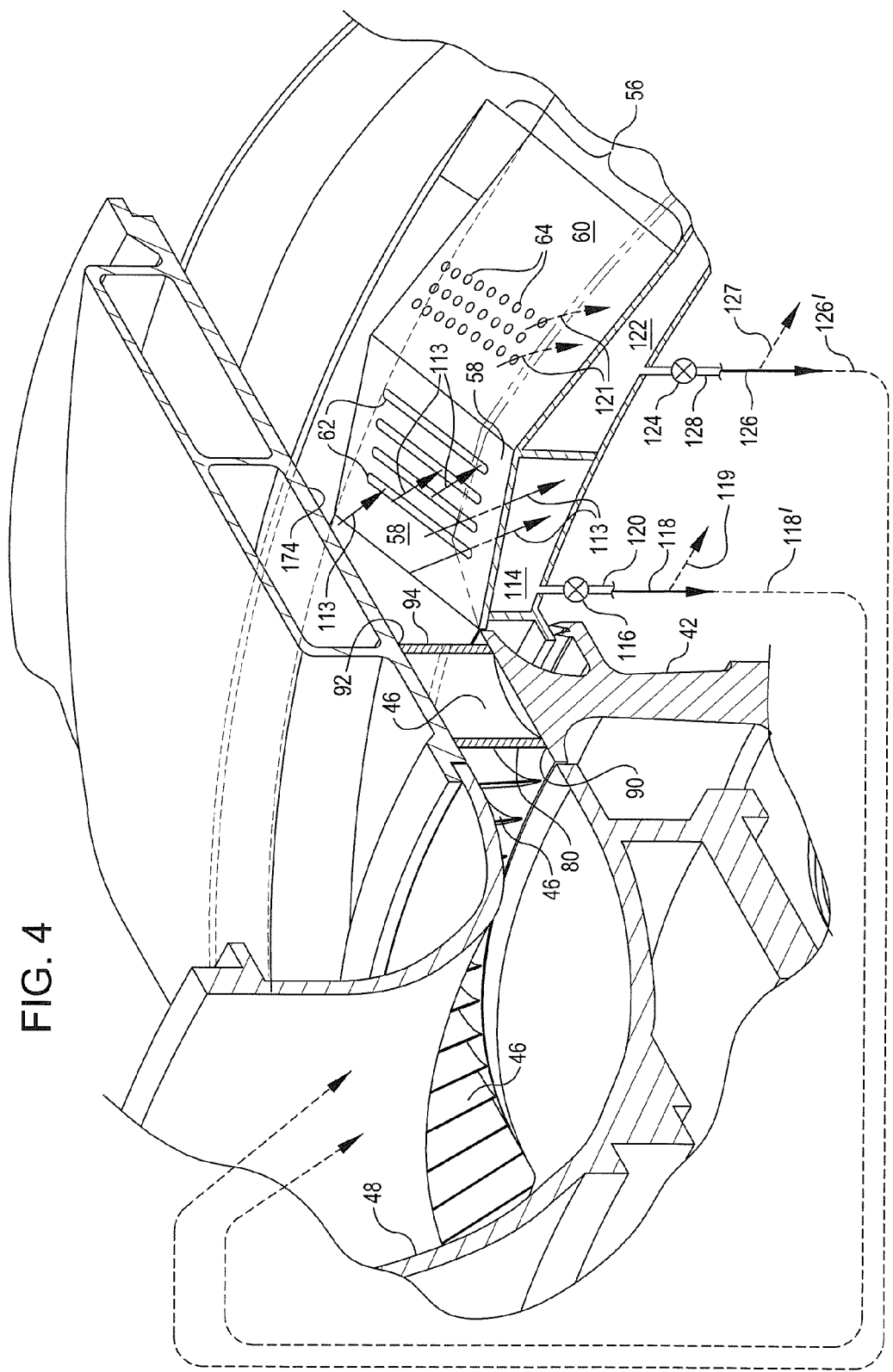
FIG. 4 is a partial cross-sectional perspective view of an embodiment for a compressor, showing an inlet passageway, impulse blades on a rotor, a stationary diffuser including an aerodynamic duct having converging and diverging portions, and boundary layer bleed passageways.

In an embodiment, such as illustrated in FIG. 4, bypass gas passageways 62 may include, in fluid communication therewith, outlet valving 116 positionable between an open, startup condition wherein discharge gas 113 is passed therethrough, and a closed, operating condition which minimizes or stops flow of discharged bypass gas 113. A sub-chamber 114 may be provided for collection of bypass gas 113, with the outlet valving 116 regulating passage of such collected bypass gas 118 outward via external passageways 120. In such embodiment, the aerodynamic ducts 56 have outlets in the form of bypass gas passageways 62 that are fluidly connected to external passageways 120. In an embodiment, collected bypass gas 118 may be returned as shown by broken line 118' to inlet passageway 48. Or, in the case of compression of air, collected bypass gas 118 may be discharged directly to the atmosphere, as indicated by broken line 119 in FIGS. 4 and 14.

Similarly, in various embodiments, the boundary layer bleed ports 64 may include outlet valving 124 positionable between an open position wherein bleed gas 121 is passed therethrough (see FIG. 4), and a closed position which avoids boundary layer gas removal via removal of bleed gas 121. For example, a boundary layer bleed sub-chamber 122 is shown for collection of bleed gas 121, with outlet valving 124 for passage of collected bleed gas 126 outward by external line 128. In such embodiment, the boundary layer bleed ports 64 from aerodynamic ducts 56 are fluidly connected to external lines 128. As also shown in FIG. 4, in an embodiment, collected bleed gas 126 may be recycled, optionally shown by broken line 126', and returned to inlet passageway 48. Or, in case of compression of air, the collected bleed gas 126 may be discharged to the atmosphere, as indicated by broken line 127 in FIGS. 4 and 14.

Figure 13:
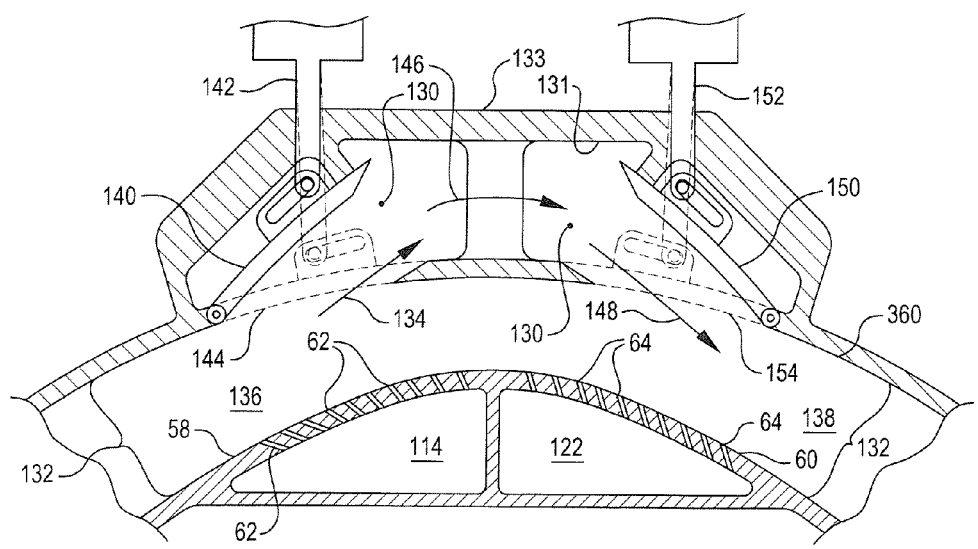
FIG. 13 is a schematic cross-sectional view of an embodiment for an aerodynamic duct including converging and diverging portions, including a stationary diffuser, illustrating both the use of a gas removal and bypass system for starting, and use of a boundary layer bleed system for control of boundary layer phenomenon.
Figure 14:
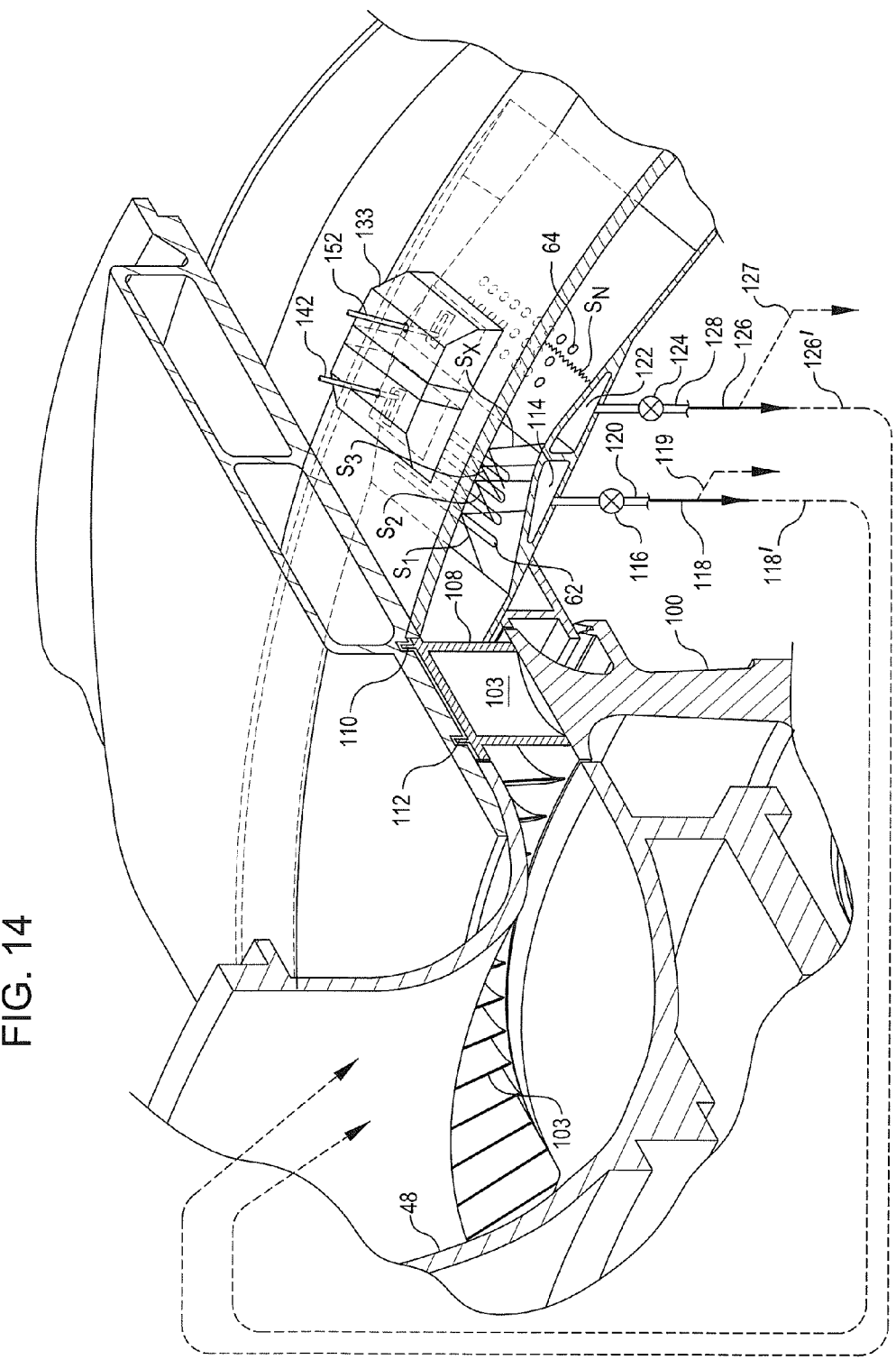
FIG. 14 is a partial cross-sectional perspective view of an embodiment for a compressor, similar to that shown in FIGS. 3 and 11 above, showing an inlet duct, impulse blades with shroud on a rotor, a diffuser including an aerodynamic duct utilizing a gas removal system for starting of the type just set forth in FIG. 13 above, and further showing the use of a boundary layer bleed system for effective control of boundary layer phenomenon.

In other embodiments, as seen in FIGS. 13 and 14, a compressor may be provided using internal starting bypass gas passageways 130 as defined by internal walls 131 of an internal gas passageway housing 133. In such configuration, the internal bypass gas passageways 130 are fluidly connected internally within or adjacent the aerodynamic ducts 132, to allow bypass gas 134 to escape a converging portion 136, and return the bypass gas 134 directly to the aerodynamic duct 132, as shown by reference arrow 148 in FIG. 13, to the diverging portion 138 thereof. In an embodiment, a hinged inlet door 140 may be provided with actuator linkage 142 for opening a bypass outlet 144 shown in broken lines. Bypass gas 134 escapes through bypass outlet 144 and is then returned as indicated by reference arrows 146 and 148 in FIG. 13 through bypass return opening 154. A hinged return door 150 may be provided with actuator linkage 152 for opening a bypass return opening 154 shown in broken lines in FIG. 13.

Figure 13A:
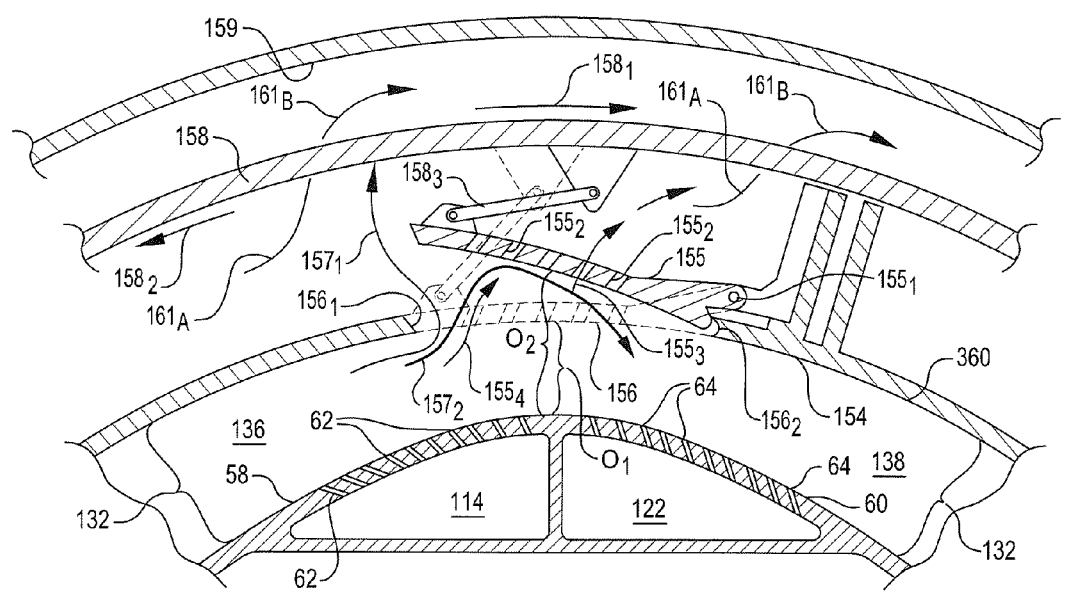
FIG. 13A is a partial cross-sectional view of an embodiment for an aerodynamic duct including converging and diverging portions, illustrating both the use of an openable door for gas removal during starting, and the use of boundary layer bleed systems for control of boundary layer phenomenon.

Attention is directed to FIG. 13A, which shows yet another embodiment for achieving startup of a supersonic shock wave in an aerodynamic duct 132. In FIG. 13A, a bypass outlet door 155 provides a bypass outlet opening 156 shown in broken lines between end walls $156_1$ and $156_2$ to allow gas shown by reference arrows 157 to escape the converging portion 136 of the aerodynamic duct 132. In an embodiment, an actuator 158 may be provided to move back and forth as noted by reference arrows $158_1$ (to open), and $158_2$ (to close) bypass outlet door 155, using linkage $158_3$ to pivot bypass outlet door 155 about pivot pin $155_1$. Escaping bypass gas noted by reference arrow $157_1$ is contained by bypass gas passageway wall 159, which provides a pressurizable plenum to contain bypass gas. In an embodiment, actuator 158 is not a bounding wall, as the escaping bypass gas noted by reference arrow $157_1$ is free to pass as indicated by reference arrows $161_A$ and $161_B$ outward to bypass gas passageway wall 159. Once pressurized, the bypass gas then escapes through the enlarged throat opening $O_2$, and thence downstream of the throat opening $O_2$ as indicated by reference arrow $157_2$. An enlarged area of $A_2$ (not shown but corresponding to opening at throat $O_2$) of throat $O_2$ when in a startup configuration (as compared to an area of $A_1$ of throat $O_1$ when in an operational configuration) enables downstream passage through the aerodynamic duct 132 of bypass gas as indicated by reference arrow $157_2$. In an embodiment, the bypass outlet door 155 may be provided with boundary layer bleed passages $155_2$, for boundary layer bleed as noted by reference arrows $155_3$ and $155_4$. More generally, startup of the supersonic shock wave is established by opening up bypass gas passageways such as bypass outlet door 155, and then bringing the blades 46 up to full speed. Then, the bypass outlet door may be smoothly closed to bring the throat $O_1$ of aerodynamic duct 132 into a design area condition which establishes a design contraction ratio for aerodynamic duct 132. At that point, back pressure, that is the static pressure in diverging portion 138 of aerodynamic duct 132, is allowed to rise to establish the design discharge pressure for operation. Boundary layer control structures are utilized during operation to control boundary layers, whether by bleed, mixing, injection, combinations thereof, or other suitable means. For shutdown, back pressure is reduced, and drive for blades 46 is turned off, and the compressor is allowed to spin to a stop.

Figure 12:
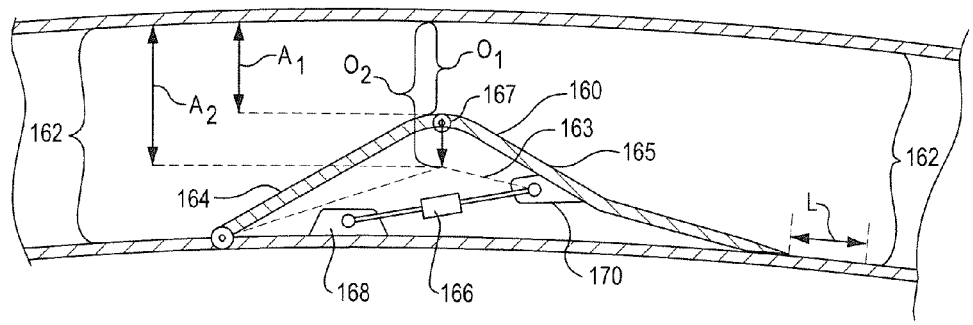
FIG. 12 is a schematic cross-sectional view of an embodiment for adjustable converging and diverging portions located within an aerodynamic duct as first illustrated in FIG. 11 above, now further showing how adjustment of the duct changes the effective contraction ratio (also known as convergence ratio) in the duct by adjusting the area available for passage of gas therethrough.

Turning to FIGS. 11 and 12, a compressor may be provided in an embodiment using geometrically adjustable portion(s) 160 in an aerodynamic duct 162. As seen in FIGS. 11 and 12, a geometrically adjustable portion 160 may be positionable between a location for use in a startup condition shown in broken lines, with a larger throat $O_2$ area of $A_2$, wherein the converging portion 164 allows increased flow of a selected gas through the aerodynamic duct 162, and a location for use in an operating condition in which the converging portion 164 is set to a selected operating position, shown in solid lines, with a throat $O_1$ area of $A_1$. The adjustment of geometrically adjustable portion 160 to the operating position and thus providing a smaller throat $O_1$ area $A_1$ shown in solid lines in FIG. 12 allows operation with a higher compression ratio than when geometrically adjustable portion 160 is at the startup position indicated in FIG. 12 by broken lines 163 and providing throat $O_2$ area $A_2$. In other words, the geometrically adjustable portion(s) 160 move, to change the contraction ratio of an aerodynamic duct 162. In various embodiments, one or more geometrically adjustable portions 160 may be located in one or more of aerodynamic ducts 162, as provided for a particular compressor. As indicated in FIG. 12, in an embodiment, adjustment of a geometrically adjustable pivotable member portion 160 may include extending the length of the converging portion 164 and diverging portion 165 of a duct 162 by a length L. In an embodiment, such adjustment may be achieved by use of a pivot pin 167. In an embodiment, an actuator 166, extending between an anchor 168 and an attachment point 170, may be provided to move the geometrically adjustable pivotable member portion 160 and allow movement such as at pivot pin 167.

Returning now to boundary layer control structures, in an embodiment, such structures may be configured as boundary layer bleed ports 64 in the various aerodynamic ducts 56 in diffuser 54, such as shown in FIG. 1, or in FIG. 4. Such boundary layer bleed ports 64 may be provided by perforations in one or more bounding walls, such as in surface 66 of a diverging portion 60 in an aerodynamic duct as shown in FIG. 1 or 4. Adjacent the boundary layer bleed ports 64 may be bleed sub-chambers, such as sub-chamber 122 noted above with respect to the embodiment depicted in FIG. 4, or as may be seen in FIG. 13. Thus, a bleed sub-chamber 122 may be provided in fluid communication with boundary layer bleed ports 64, and thus bleed sub-chambers 122 are configured for passage therethrough of gas removed through the boundary layer bleed ports 64. Although the boundary layer bleed ports 64 are shown in a diverging portion 60, such bleed ports may be located in other bounding walls of aerodynamic ducts 56, such as on radially outward portions, or on sidewalls, or on other radial inward portions.

Figure 26:
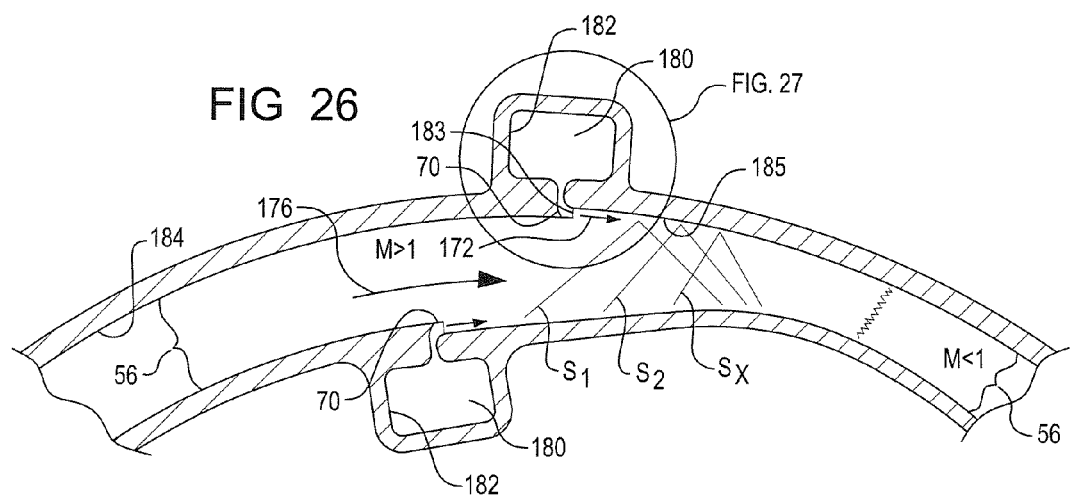
FIG. 26 is a partial cross-sectional view taken along the centerline of an aerodynamic duct having a converging and diverging portion therein, showing the use of pressurized gas supplied by supply conduits for use in boundary layer control by gas injection.
Figure 27:
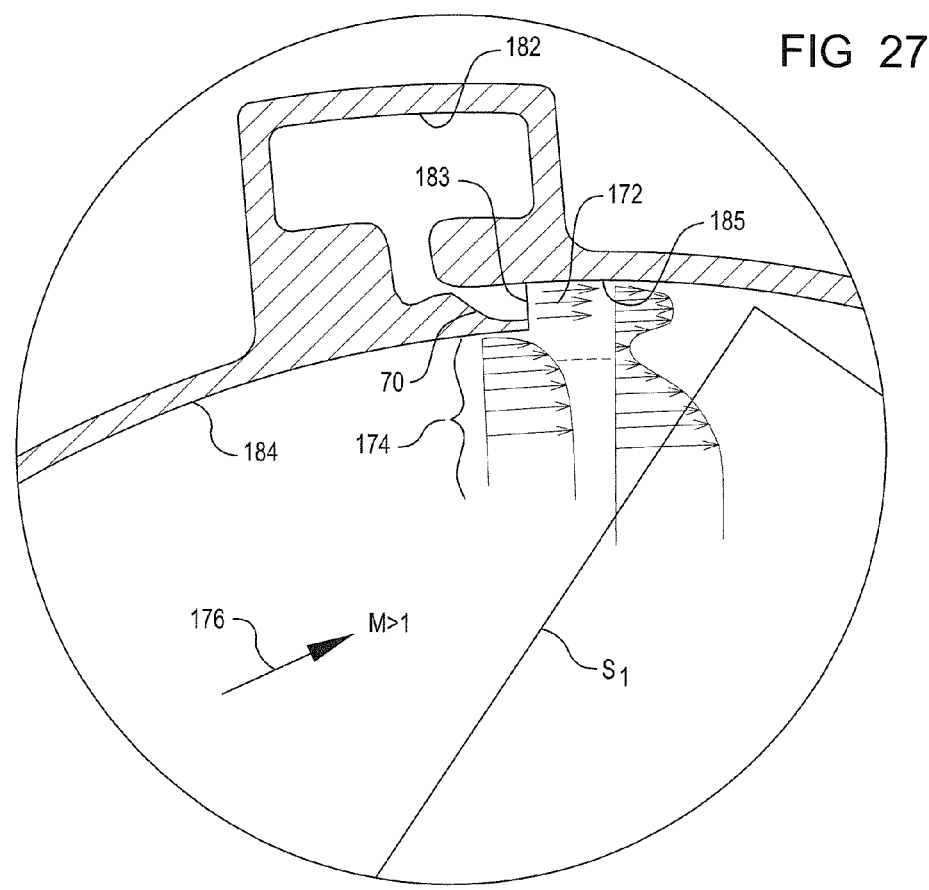
FIG. 27 shows an enlarged portion of the partial cross-sectional view provided in FIG. 26, showing the use of a conduit for providing a supply of gas for injection of a gas jet to control boundary layer buildup at the wall near an expansion shock in an aerodynamic duct.

In yet another embodiment, boundary layer control may be provided via use of boundary layer control structures such as inlet jets 70 as shown in FIGS. 26 and 27. (Note that inlet jets 70 may also be described as inlet nozzles.) In an embodiment inlet jets 70 may be oriented to inject gas 172 into a boundary layer 174 in a direction consistent with flow of gas through one or more aerodynamic ducts 56, thus speeding up and thereby energizing the boundary layer 174 in the gas flow direction, which is shown by reference arrow 176 in FIGS. 26 and 27. As shown in FIG. 26, in an embodiment, injection gas chambers 180 defined by chamber walls 182 may be provided adjacent the one or more aerodynamic ducts 56. The injection gas chambers 180 are in fluid communication with inlet jets 70, and injection gas chambers 180 are configured for passage therethrough of gas to be injected via the inlet jets 70. Thus in an embodiment, the boundary layer control structures configured as inlet jets 70 are positioned adjacent a bounding surface 184 or 185 in one or more aerodynamic ducts 56. As shown in FIGS. 26 and 27, the inlet jets 70 may be positioned to discharge gas 172 in a direction substantially aligned with flow of gas 176 through the one or more aerodynamic ducts 56. As depicted in FIG. 27, the injection inlet jets 70 are sized and shaped to provide a jet of gas 172 that energizes the boundary layer by increasing the momentum of an adjacent flow of boundary layer 174 of gas of the aerodynamic ducts 56 into which gas 172 from the injection inlet jet 70 is injected.

In an embodiment, injection jet(s) 70 may be provided in the form of at least one nozzle in fluid communication with a source of high pressure gas, such as injection gas chambers 180. Gas from the source of high pressure gas such as injection gas chambers 180 is provided at a pressure higher than the pressure of the gas in the boundary layer 174. The injection jets 70 have an outlet nozzle 183 downstream of surface 184 and adjacent a surface 185 in an aerodynamic duct. The injection jets 70 are positioned and shaped in a manner so as to direct the high pressure gas from the source of high pressure gas out through the injection jets 70 and into the boundary layer 174. In an embodiment, the injection jets 70 may be shaped in a manner so as to direct such high pressure gas both into the boundary layer 174 and along the surface 185, to re-energize the boundary layer's 174 pressure profile, so that such pressure profile approaches a freestream gas profile prior to ingestion of the boundary layer gas. In an embodiment, the surface 185 may be substantially smooth and continuous surface downstream of the injection jets 70.

Figure 20:
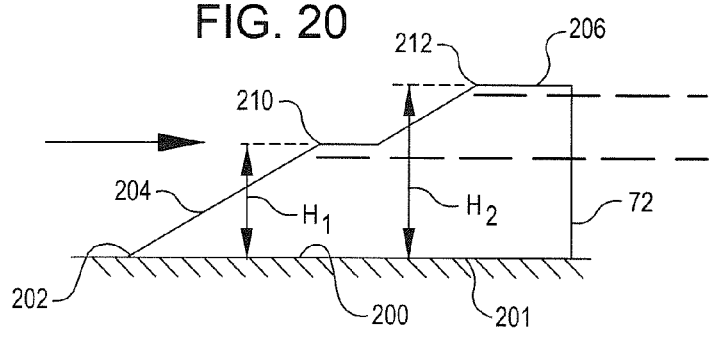
FIG. 20 is a diagrammatic side view for an embodiment for a vortex generator affixed to a selected surface of an aerodynamic duct, wherein the vortex is designed to generate at least one (1) vortex, and here showing the generation of two (2) vortices from an incoming gas flow as indicated by heavy broken lines.
Figure 21:
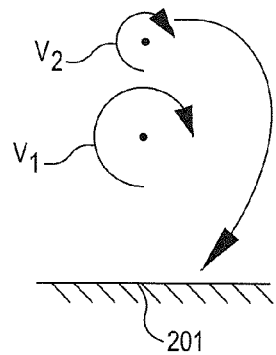
FIG. 21 is a diagrammatic end view for the embodiment of a vortex generator as just illustrated in FIG. 20 above, showing two (2) vortices, a larger one and a smaller one, as first generated above a selected surface of an aerodynamic duct.
Figure 22:
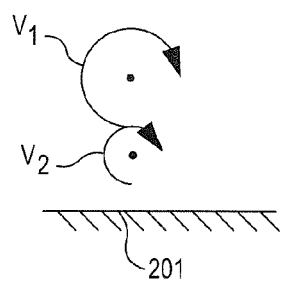
FIG. 22 is a diagrammatic end view for the embodiment of a vortex generator as just illustrated in FIGS. 20 and 21 above, showing two (2) vortices, a larger one and a smaller one, as the two vortices turn and flip the smaller vortex downward against the selected surface of an aerodynamic duct, so as to become located in a position for effecting work on a boundary layer adjacent the selected surface.

Turning now to FIGS. 20 through 25, in an embodiment, boundary layer control structures may be provided as vortex generators, such as vortex generators 72 and 74. Further, as shown in FIG. 11, a vortex generator 72 may be located on a converging portion 164 in an aerodynamic duct 162. Likewise, a vortex generator 74 may be located on a diverging portion 165 of an aerodynamic duct 162. As shown in FIG. 20, the vortex generator 72 may include a base 200 attached to a suitable surface 201 with a forward end 202 and a leading edge 204 extending outward and rearward. i.e., in a downstream direction from the forward end 202 of the base to an outward end 206. In an embodiment, the leading edge 204 includes at least one angular discontinuity 210 along the leading edge 204, for generating at least one vortex. In an embodiment, the leading edge 204 includes a first angular discontinuity 210 at a height $H_1$ above the base 200, and a second angular discontinuity 212 at a height $H_2$ above the base 200, for generating two vortices. As shown for vortex generator 74 in FIG. 23, in an embodiment, the leading edge 204 includes a first angular discontinuity 210 at a height $H_1$ above the base 200, a second angular discontinuity 212 at a height $H_2$ above the base 200, and a third angular discontinuity 214 at a height $H_3$ above the base 200, for generating three vortices. In various embodiments, a plurality of vortex generators 72 and or 74 may be provided in each of one or more aerodynamic ducts 162 (see FIG. 12), or like aerodynamic ducts 56 as illustrated, for example, in FIG. 1. Vortex generators may be provided in the just described novel configurations, or in heretofore known configurations as will be understood by those of skill in the art.

In an embodiment, vortex generators may be provided having height $H_1$ that is about 1.6 times the result of height $H_2$ minus height $H_1$. In an embodiment, height $H_2$ may be about 1.6 times the result of height $H_3$ minus height $H_2$. Thus, in an embodiment, the height ratios of discontinuities in vortex generators for generating vortices in the respective multi-vortex embodiments may be about 1.6, roughly the so called "golden ratio". Generally, the golden ratio (more precisely 1.618) is denoted by the Greek lowercase letter phi ($\phi$). With respect to vortex strength, if the height ratios are equal to phi ($\phi$), then the strength ratios, that is the comparative strength between the first and second vortices, should be equal to $(\phi)^{-2}$. Generally, as depicted between FIGS. 21 and 22, and likewise in FIGS. 24 and 25, in a vortex generator design, a useful technique may be to use the larger, and stronger vortex, say $V_1$, to turn a smaller vortex, say, $V_2$, toward the surface 201. Likewise, with three vortices, such technique involves turning the larger and stronger vortices, say $V_1$ and $V_2$, to drive the smaller vortex $V_3$ toward the surface 201. In such manner, a larger vortex $V_1$, which might not otherwise be able to mix with a boundary layer against surface 201, is able to bring energy to mix higher energy fluid with the boundary layer by virtue of carriage of the smaller vortex $V_3$ toward surface 201.

Figure 17:
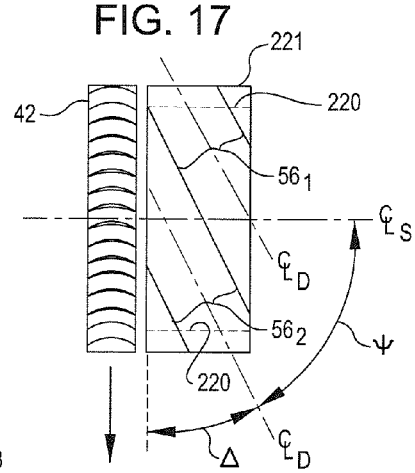
FIG. 17 is a diagrammatic side view for an embodiment for a compressor, depicting the use of an impulse bladed rotor (possible additional blade shroud is not shown) with a diffuser including a plurality of aerodynamic ducts located around a surface of rotation, in an embodiment helicoidally, and wherein the surface of rotation as indicated by broken lines is generally cylindrical in shape.
Figure 18:
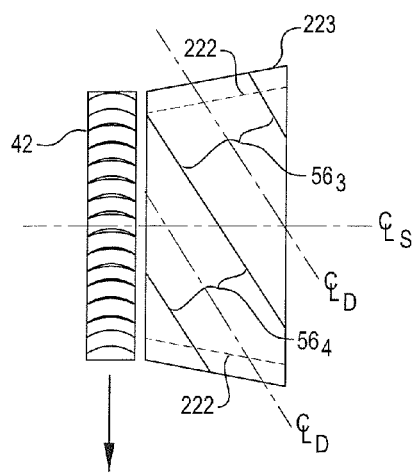
FIG. 18 is a diagrammatic side view for an embodiment for a compressor, depicting the use of an impulse bladed rotor (possible additional rotor shroud is not shown) with a diffuser including a plurality of aerodynamic ducts located around a surface of rotation, in an embodiment in a generally spiral configuration, and wherein the surface of rotation as indicated by broken lines is generally in the shape of an outwardly sloping truncated cone.
Figure 19:
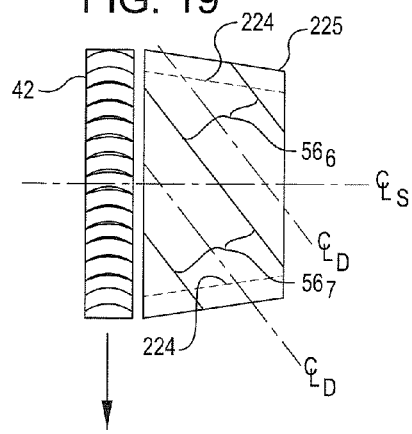
FIG. 19 is a diagrammatic side view for an embodiment for a compressor, depicting the use of an impulse bladed rotor (possible additional shroud is not shown) with a diffuser including aerodynamic ducts located around a surface of rotation, in an embodiment in a generally spiral configuration, and wherein the surface of rotation as indicated by broken lines is generally in the shape of an inwardly sloping truncated cone.

In various embodiments, as shown in FIGS. 17, 18 and 19, the one or more aerodynamic ducts 56 are disposed in a stator, such as a stationary diffuser 54 as depicted in FIG. 1 above, and may be wrapped around a longitudinal axis, shown along the centerline $C_{LS}$. In an embodiment, as indicated in FIG. 17, one or more of the one or more aerodynamic ducts 56 of a stationary diffuser 221 are wrapped as if over a substantially cylindrical substrate 220. In such an embodiment, aerodynamic ducts 56 may be helically arranged in adjacent positions at a substantially constant helical angle psi ($\psi$) about the longitudinal axis shown along the centerline of the stator, $C_{LS}$. Alternately, the orientation of aerodynamic ducts 56 may be described by use of the complementary lead angle delta ($\Delta$), as shown in FIG. 17. In such an embodiment, the centerline $C_{LD}$ of a first aerodynamic duct $56_1$ and the centerline $C_{LD}$ of a second aerodynamic duct $56_2$ (and other ducts in the embodiment) may be parallel. In various embodiments, a helical angle psi ($\psi$) in the range of from about forty-five degrees (45°) to about eighty degrees (80°) may be employed. In the designs disclosed herein, it may be advantageous to receive gas in aerodynamic ducts, for example, $56_1$ in FIG. 17, without turning the flow as delivered from blades 46 as shown in FIG. 1. In a different design as depicted in FIG. 18, aerodynamic ducts $56_3$ and $56_4$ of a diffuser 223 may be wrapped as if over an outwardly expanding conical section as a substrate 222. In yet another and still different alternative embodiment, as seen in FIG. 19, aerodynamic ducts $56_6$ and $56_7$ in a diffuser 225 may be wrapped as if over an inwardly decreasing conical section as a substrate 224.

Overall, as may be envisioned in part from FIG. 9, a supersonic gas compressor 230 may be provided for compressing a selected gas 232, where the compressor 230 includes a casing 234 having a low pressure gas inlet 236 and a high pressure gas exit 238. A volute or collector 239 may be utilized downstream of the diffuser 54 to further convert kinetic energy to pressure energy in a high pressure gas 240. A rotor 42 with blades 46 as shown in FIG. 1 (or shrouded blades 103 on rotor 100 as shown in FIGS. 10 and 11) may be provided to act on the selected gas 232 to impart velocity thereto to provide a supersonic gas flow 52 (see FIG. 1) to a diffuser 54 that includes one or more aerodynamic ducts 56. As shown in FIG. 9, provision may also be made for a deswirler 57, located downstream of diffuser 54, to turn the gas flow toward the axial direction, when required. However, losses associated with deswirler 57 may be avoided in some instances, and may be optional when discharging to a volute 239 as indicated in FIG. 9. The rotor 42 with blades 46 (or shrouded blades 103 on rotor 100, as shown in FIGS. 10 and 11) may be driven by shaft 238 from driver 241 (e.g., electric motor or other power source), the choice of driver type and size, and associated drive train components such as gearbox 242 or bearings 244, etc., may be selected by those of skill in the art for a particular application.

Figure 28:
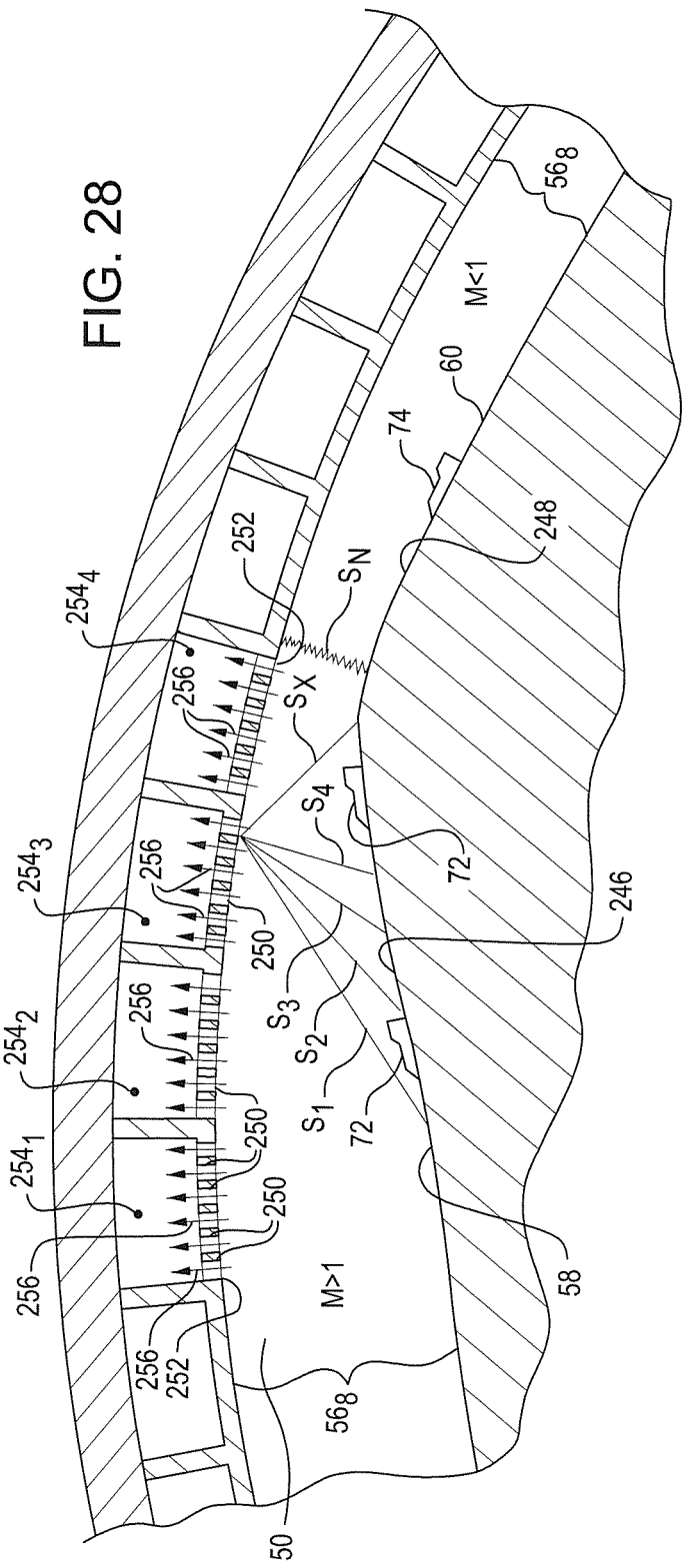
FIG. 28 is a cross-sectional view along the centerline of a generally helicoidal aerodynamic duct in a diffuser, showing an embodiment wherein a compression ramp is located on an inward surface, and wherein bleed air passageways for starting are located on an outward surface of the aerodynamic duct, and also showing a plurality of oblique shock structures $S_1, S_2, S_3$, and $S_x$, as well as a normal shock $S_N$, and the use of vortex generators to control a boundary layer adjacent a radially interior surface of the aerodynamic duct.

As can be seen in FIG. 28, an exemplary aerodynamic duct $56_8$ may be provided in a stationary diffuser 54 of the type shown in FIG. 1. The aerodynamic duct $56_8$ shown in FIG. 28 may be considered, in an embodiment, as generally helically disposed about a longitudinal axis, such as about centerline $C_{LS}$ of FIG. 17. Returning to FIG. 28, the aerodynamic duct $56_8$ includes a converging portion 58 and a diverging portion 60 (here shown provided by ramps 246 and 248, respectively, on the radially-inward side of the aerodynamic duct $56_8$) that with input of a supersonic (Mach>1) gas flow generates a plurality of oblique shock waves $S_1$ to $S_x$ and a normal shock wave $S_N$ in a selected gas 50 as the gas passes through the aerodynamic duct $56_8$ from supersonic conditions (Mach>1) to subsonic conditions (Mach<1). The aerodynamic duct $56_8$ may be designed, i.e., sized and shaped, for an inlet relative Mach number for operation associated with a design operating point selected within a design operating envelope for a selected gas composition, gas quantity, and gas compression ratio. A compressor design may be configured for a selected mass flow, that is for a particular quantity of gas that is to be compressed, and that gas may have certain inlet conditions with respect to temperature and pressure (or an anticipated range of such conditions), that must be considered in the design. The incoming gas may be relatively pure single component, or may be a mixture of various elements or various compounds or of various elements and compounds, or the gas may be expected to range in composition. And, it may be desired to achieve a particular final pressure, when starting at a given inlet gas pressure, and thus, a desired gas compression ratio must be selected for a particular compressor design. Given design constraints such as gas composition, mass flow of gas, inlet conditions, and desired outlet conditions the aerodynamic ducts for a particular compressor must be sized and shaped for operation at a selected inlet Mach number and gas compression ratio. The designs described herein allow use of high gas compression ratios, especially compared to self starting compressor designs that lack the ability to adjust the effective contraction ratio. Thus, the designs provided herein provide for compression in aerodynamic ducts which can be started, as regards swallowing a shock structure and establishing a stable supersonic shock configuration during operation, yet retain design features that enable high pressure ratio operation, including oblique shock structure and throat size to support design throughput and compression pressure ratios. As shown in FIG. 28, in an embodiment, bypass gas passageways may be provided as outlets 250 in a bounding surface 252 of aerodynamic duct $56_8$ (here bounding surface 252 is shown as a radially outward bounding surface of aerodynamic duct $56_8$). The bypass gas passageway outlets 250 are in fluid communication with outboard chambers 254 (individually indicated as outboard chambers $254_1$, $254_2$, $254_3$, and $254_4$) so that the effective contraction ratio of aerodynamic duct such as duct $56_8$ may be changed by removal of gas therefrom, as indicated by arrows 256. Also, in an embodiment, a suitable boundary layer control structure as described herein may be selected, such as the use of a plurality of vortex generators 72, 74.

Similarly, as can be seen in FIG. 29, an aerodynamic duct 56 such as exemplary aerodynamic duct $56_9$ may be provided in a stationary diffuser 54 such as shown in FIG. 1. The aerodynamic duct $56_9$ shown in FIG. 29 may be helically wrapped around a longitudinal axis of a diffuser 54, for example as if the section provided in the present FIG. 29 were taken along the centerline $C_{LD}$ shown for aerodynamic duct $56_2$ in FIG. 1 above. As seen in FIG. 29, the aerodynamic duct $56_9$ includes a converging portion 58 and a diverging portion 60 (here shown provided by ramps 260 and 262, respectively, on the radially outward side of aerodynamic duct $56_9$) that with input of a supersonic (Mach>1) gas flow generates a plurality of oblique shock waves $S_1$ to $S_x$ and a normal shock wave $S_N$ in a selected gas 50 as the gas passes through the aerodynamic duct $56_9$ from supersonic conditions (Mach>1) to subsonic conditions (Mach<1). The aerodynamic duct $56_9$ may be designed, i.e., sized and shaped, for an inlet relative Mach number for operation associated with a design operating point selected within a design operating envelope for a selected gas composition, gas quantity, and gas compression ratio. As shown in FIG. 29, in an embodiment, bypass gas passageways may be provided as outlets 264 in a bounding surface 266 of aerodynamic duct $56_9$ (here bounding surface 266 is shown as a radially inward bounding surface of aerodynamic duct $56_9$). The bypass gas passageway outlets 264 are in fluid communication with inboard sub-chambers 268 (individually indicated as inboard sub-chambers $268_1$, $268_2$, $268_3$, $268_4$, etc.) so that the effective contraction ratio of aerodynamic ducts such as duct $56_9$ may be changed by removal of gas therefrom, as indicated by arrows 269. Also, in an embodiment, a suitable boundary layer control structure as described herein may be selected, for example, using boundary layer bleed ports 270 for removal of gas 271 into inboard bleed sub-chambers $272_1$, $272_2$, $272_3$. Also, a plurality of vortex generators 72, 74, may, in an embodiment, be employed for assistance in boundary layer control. However, note the availability of outboard chambers $273_1$, $273_2$, $273_3$, etc., which also may be utilized as otherwise described herein for either bypass gas removal, or for boundary layer bleed and control, as appropriate for a particular design.

Yet another configuration for an exemplary aerodynamic duct $56_{11}$ for use in a diffuser 54 such as first shown in FIG. 1 may be seen in FIG. 30. As shown in FIG. 30, an exemplary aerodynamic duct $56_{11}$ may, in an embodiment, be in a helical arrangement and wrapped around a longitudinal axis of a diffuser, for example as if the section provided in the present FIG. 30 were taken along the centerline $C_{LD}$ shown for aerodynamic duct $56_2$ in FIG. 1. As shown in FIG. 30, the aerodynamic duct $56_{11}$ includes a converging portion 58 and a diverging portion 60. In this embodiment, opposing radial bounding walls in the form of inboard converging ramp 274 and outboard converging ramp 276 provide a converging portion 58. Also, in this embodiment, opposing radial bounding walls in the form of an inboard diverging ramp 280 and an outboard diverging ramp 281 provide a diverging portion 60. Additionally, the aerodynamic duct $56_{11}$, like other aerodynamic ducts 56, includes sidewalls as necessary to form a pressurizable duct, which in an embodiment may be in the form of lateral partition walls, not shown in FIG. 28, 29, or 30, but may be provided as partition walls 364 (individually identified as partition walls $364_1$, $364_2$, $364_3$, etc. as appropriate given the number of aerodynamic ducts 56 utilized) as illustrated for exemplary diffuser 54 designs shown in FIGS. 1, 7, and 8. In the embodiment shown in FIG. 30, the inboard converging ramp 274 and the outboard converging ramp 276 receive input of a supersonic (Mach>1) gas flow and generate a plurality of oblique shock waves $S_1$ to $S_x$ and a normal shock wave $S_N$ in a selected gas 50 as the gas passes through the aerodynamic duct $56_{11}$ from supersonic conditions (Mach>1) to subsonic conditions (Mach<1). The aerodynamic duct $56_{11}$ may be designed, i.e., sized and shaped, for an inlet relative Mach number for operation associated with a design operating point selected within a design operating envelope for a selected gas composition, gas quantity, and gas compression ratio. As shown in FIG. 30, in an embodiment, bypass gas passageways may be provided as outlets 278 in a bounding surface of aerodynamic duct $56_{11}$ (here a radially outward bounding surface of aerodynamic duct $56_{11}$ is shown as outboard converging ramp 276). The bypass gas passageway outlets 278 are in fluid communication with outboard chambers 282 (individually indicated outboard chambers $282_1$, $282_2$, $282_3$, etc.) so that the effective contraction ratio of aerodynamic ducts such as duct $56_{11}$ may be changed by removal of gas therefrom, as indicated by arrows 284. Additionally, bypass gas passageways may be provided as outlets 288 in a bounding surface of aerodynamic duct $56_{11}$ (here such bounding surface is shown as a radially inward bounding surface of aerodynamic duct $56_{11}$, namely inboard converging ramp 274). The bypass gas passageway outlets 288 are in fluid communication with inboard sub-chambers 292 (individually indicated as inboard sub-chambers $292_1$, $292_2$, and $292_3$, etc.) so that the effective contraction ratio of aerodynamic ducts such as duct $56_{11}$ may be changed by removal of gas therefrom, as indicated by arrows 284 and 294 (shown in FIG. 30). Also, in an embodiment, a suitable boundary layer control structure as described herein may be selected, for example, using boundary layer bleed ports 294 for removal of gas 296 into inboard bleed sub-chambers $298_1$, $298_2$, $298_3$. And, in an embodiment, a plurality of vortex generators, indicated as "VGs" 72, 74, may be utilized to minimize adverse boundary layer effects.

Figure 33:
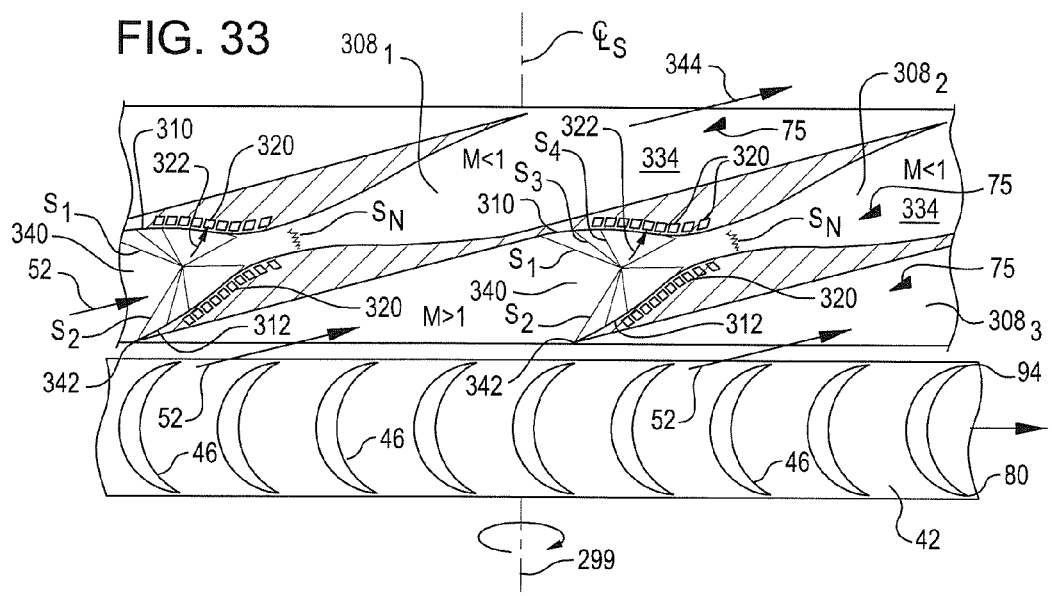
FIG. 33 is partial circumferential view showing the longitudinal centerline of a diffuser, and the generally helical aerodynamic ducts used therein, as well as the accompanying rotor and its rotational centerline, showing an embodiment wherein a compression ramp is located on an inward leading edge surface, and also on a trailing edge, and wherein bleed air passageways for starting are located on both of the converging compression ramp surfaces, and also showing a plurality of oblique shock structures $S_1, S_2, S_3, S_4$, etc., as well as a normal shock $S_N$.

Attention is now directed to FIGS. 31, 32, and 33, which provide yet further embodiments for a supersonic compressor, and more specifically, for the configuration of a stationary diffuser in such a compressor, wherein lateral gas compression, which occurs in a channel between bounding adjacent sidewalls, rather than radial compression (i.e., which occurs in a channel between radially spaced apart bounding walls), is utilized in an aerodynamic duct. FIGS. 31, 32, and 33 provide partial circumferential views showing the longitudinal centerline $C_{LS}$ of a stationary diffuser (stator), and generally helical aerodynamic ducts used therein, as well as the accompanying rotor 42 (as is seen in FIG. 1) and its rotational centerline 299. In the embodiments depicted in FIGS. 31, 32, and 33, an aerodynamic duct design is provided wherein the compression is done laterally, that is, in a channel between spaced apart sidewalls, rather than via radially spaced apart bounding walls that occur in an aerodynamic duct, as for example are shown in FIG. 1, or as just set forth in detail in FIGS. 28, 29, and 30 for various alternate embodiments. FIG. 31 illustrates an embodiment wherein compression is performed in aerodynamic ducts 300 (individually indicated as aerodynamic ducts $300_1$, $300_2$, and $300_3$, etc.) using a respective downstream sidewall 302. FIG. 32 provides an embodiment wherein compression is performed in aerodynamic ducts $304_1$, $304_2$, and $304_3$, etc using an upstream sidewall 306. FIG. 33 provides an embodiment wherein compression is performed in aerodynamic ducts $308_1$, $308_2$, and $308_3$, etc using both a downstream sidewall 310 and an upstream sidewall 312.

In FIG. 31, a rotor 42 having a plurality of blades 46 may be provided as described above. Alternately, a shrouded rotor (e.g., rotor 100 with shroud 102 as shown in FIGS. 10 and 11) may be utilized, as described above. Gas 52 at supersonic velocity (Mach>1) is provided to a plurality of aerodynamic ducts 300. A converging portion 314 is provided using a downstream sidewall 302, which reflects oblique shocks $S_1$, $S_2$, etc. generated via leading edge 316. In such embodiment, the radially inward bounding wall 318 of an aerodynamic duct 300 may be smoothly rounded in conformance with an underlying base, such as a cylinder, or conic shape as shown in FIGS. 17, 18, and 19, or other smoothly curved shape. In an embodiment, bypass gas outlets 320 may be provided for removal of bypass gas 322 during starting, for example to outboard or inboard sub-chambers (not shown) as otherwise described elsewhere herein. Upon establishment of normal shock $S_N$ at a desired design location for selected operational conditions, removal of bypass gas 322 may be terminated. As gas slows in the subsonic portion (Mach<1) of the aerodynamic ducts $300_1$, $300_2$, $300_3$, etc., kinetic energy of the gas 52 is converted into gas pressure.

In FIG. 32, yet another embodiment is depicted. Here, a rotor 42 having a plurality of blades 46 may be provided as described above. Alternately, a shrouded rotor (e.g., rotor 100 with shroud 102 as illustrated in FIGS. 10 and 11) may be utilized. Gas flow 52 at supersonic velocity (Mach>1) is provided to a plurality of aerodynamic ducts 304, here identified in part as individual aerodynamic ducts $304_1$, $304_2$, and $304_3$. A converging portion 330 is provided using an upstream sidewall 306, which reflects oblique shocks $S_1$, $S_2$, etc. generated via leading edge 332. In such embodiment, the radially inward bounding wall 334 of an aerodynamic duct 304 may be smoothly rounded in conformance with an underlying base, such as a cylinder, or conical shape as shown in FIGS. 17, 18, and 19, or other smoothly curved shape. In such an embodiment, bypass gas outlets 320 may also be provided for removal of gas 322 during starting, for example to outboard chambers or inboard sub-chambers (not shown) as otherwise described elsewhere herein. Upon establishment of normal shock $S_N$ at a desired design location for selected operational conditions, removal of bypass gas 322 may be terminated. As gas slows in the subsonic portion (Mach<1) of the aerodynamic ducts $304_1$, $304_2$, $304_3$, etc., kinetic energy of the gas is converted into gas pressure.

In FIG. 33, yet another embodiment using lateral compression, rather than radial compression, is depicted. Here, a rotor 42 having a plurality of blades 46 may be provided as described above. Alternately, a shrouded rotor (e.g., rotor 100 with shroud 102 for blades 103 as illustrated in FIGS. 10 and 11) may be utilized. Gas flow 52 at supersonic velocity (Mach>1) is provided to a plurality of aerodynamic ducts 308, here identified in part as individual aerodynamic ducts $308_1$, $308_2$, and $308_3$. Compression is accomplished in a converging portion 340 utilizing both a downstream sidewall 310 and an upstream sidewall 312. An upstream leading edge 342 is provided to intercept gas flow 52 entering the aerodynamic ducts 308 of a stationary diffuser. A set of oblique shock waves $S_1$, $S_2$, $S_3$, etc. and a normal shock wave $S_N$ are generated, and exit gas 344 is provided at subsonic (Mach<1) conditions. In such embodiment, the radially inward bounding wall 334 of an aerodynamic duct $308_1$, $308_2$, $308_3$, etc., may be smoothly rounded in conformance with an underlying base, such as a cylinder, or conic shape as shown in FIGS. 17, 18, and 19 above, or another shape. In such embodiment, bypass gas outlets 320 may also be provided for removal of gas 322 during starting, for example to outboard sub-chambers (not shown) such as described with reference to FIG. 28, 29, or 30, or inboard sub-chambers, for example as otherwise described elsewhere herein with reference to FIGS. 4, 5, and 6.

Figure 15:
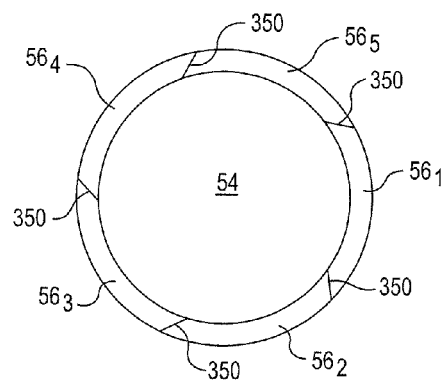
FIG. 15 is a vertical cross-sectional view taken at line 15-15 of FIG. 1, showing an embodiment for an entrance to a diffuser, here showing five (5) aerodynamic ducts, and further showing short height of leading edges of the aerodynamic ducts.
Figure 16:
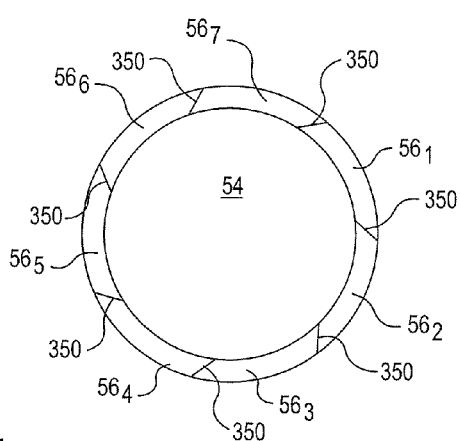
FIG. 16 is a vertical cross-sectional view taken as if at line 16-16 of FIG. 1, but now showing the entrance to an alternate embodiment using a diffuser having seven (7) aerodynamic ducts, and further showing a short height for leading edges of the aerodynamic ducts.

As shown in FIG. 1, aerodynamic ducts 56 in diffuser 54 may be constructed with leading edges 350. Certain details pertinent to various embodiments are shown in FIGS. 8, 8A, 8B, 8C, 15, and 16. In FIG. 15, an embodiment is shown for a stationary diffuser 54 having five (5) aerodynamic ducts $56_1$ through $56_5$, and wherein each of such aerodynamic ducts $56_{1 through 5}$ includes a leading edge 350. In FIG. 16, an embodiment is shown for a stationary diffuser 54 having seven (7) aerodynamic ducts $56_1$ through $56_7$, and wherein each of such aerodynamic ducts includes a leading edge 350. Generally, the shaper the leading edge 350, the better performance will be provided, that is, losses will be minimized, when operating at supersonic conditions at the inlet, as compared to use of a leading edge that is not as sharp. In an embodiment, a leading edge 350 may be provided having a leading edge radius R of from about 0.005 inches to about 0.012 inches, as shown in FIG. 8C. The leading edge 350 may be provided using a sharp leading edge wedge angle theta ($\theta$), which may in an embodiment be between about five (5) degrees and about ten (10) degrees, as shown in FIG. 8A. Also, as seen in FIG. 8B, leading edge 350 may be provided sloping rearward, i.e. in a downstream direction at a slope angle mu ($\mu$) as measured between the leading edge 350 and a tangent line 352 with underlying radially inward bounding wall 354. Such sloping leading edge 350 may start at a lower front end 356 and end at an upper rear end 358. The leading edge 350 may be sealed to or affixed to a radially inward bounding wall 354 at the lower front end 356, and may be sealed to or affixed to (for example, using welded assembly) or otherwise sealingly provided (for example, machined from a common workpiece) with respect to radially outward bounding wall 360 at the upper rear end 358 of leading edge 350.

Figure 7:
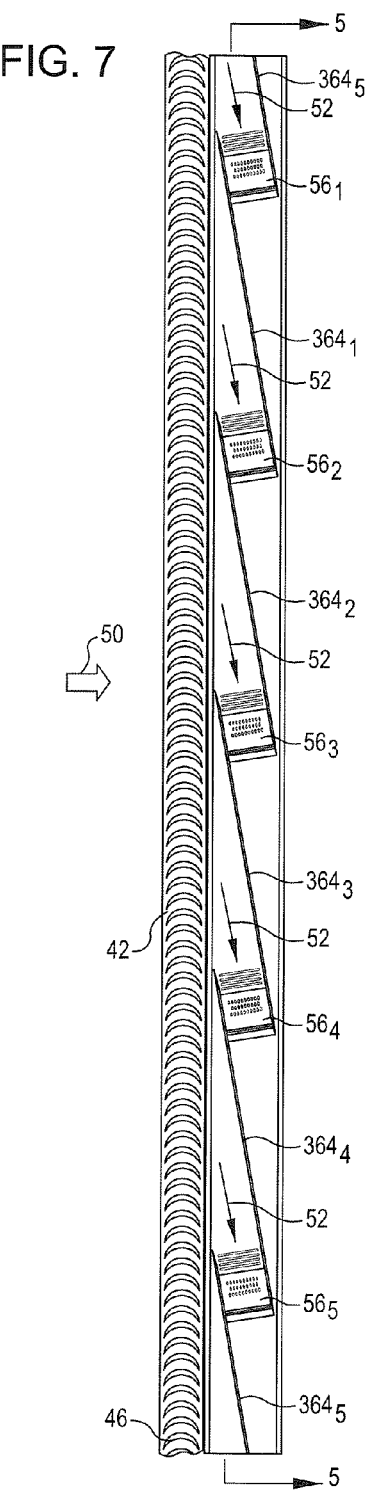
FIG. 7 provides a circumferential view of an exemplary gas flow path into an impulse bladed rotor and thence through a diffuser having leading edges followed by a plurality of aerodynamic ducts each having a converging portion provided via a compression ramp and a diverging portion illustrated by expansion ramps, and showing bypass bleed passageways for starting, and boundary layer outlet bleed ports to assist in boundary layer control, for shock stability, and for efficiency.

Rearward (in the downstream, gas flow direction) from leading edge 350, a partition wall 364 may be utilized. In various embodiments, for example as seen in FIG. 7, a common partition wall 364 may be utilized between adjacent aerodynamic ducts 56 for example, between individually identified aerodynamic ducts $56_1$, $56_2$, etc., through duct $56_5$ as depicted in FIGS. 7 and 15. As shown in FIG. 7, partition walls 364 are individually identified as partition walls $364_1$, $364_2$, $364_3$, etc. as appropriate given the number of aerodynamic ducts 56 utilized. In an embodiment, partition walls 364 may be provided with a thickness T of about 0.100 inches, or less. In summary, an efficient compressor may be provided when aerodynamic ducts 56 are located adjacent one to another. Such design is even more efficient when adjacent aerodynamic ducts 56 have a common partition wall 364 therebetween. In various embodiments, a leading edge 350 may provide an upstream terminus for a partition wall, such as partition wall 364.

Figure 8:
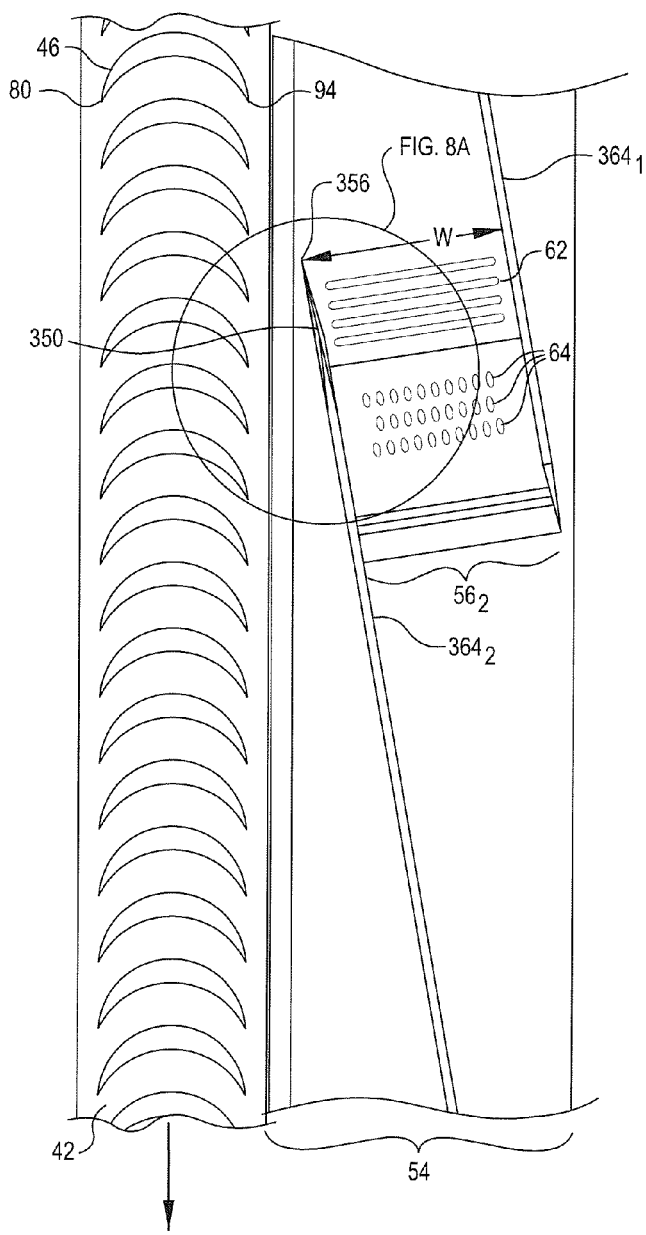
FIG. 8 is an enlargement of a portion of the circumferential view just provided in FIG. 7, now showing a leading edge of an aerodynamic duct in a diffuser, and also showing a converging portion provided via a compression ramp and diverging portion illustrated by an expansion ramp, and showing starting bleed ports and boundary layer ports.
Figure 8A:
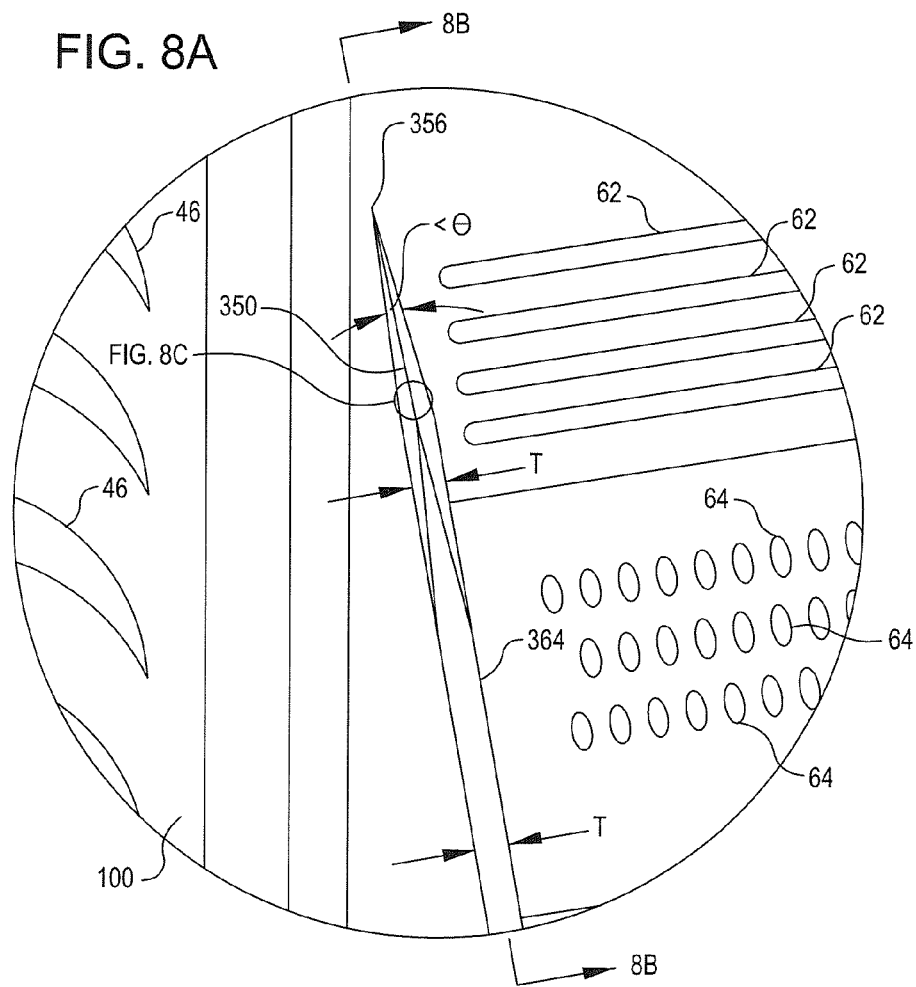
FIG. 8A is an enlarged portion of FIG. 8, showing a leading edge wedge angle for a stator, and a partition wall located rearward, i.e. downstream therefrom which, in an embodiment, may be configured as a common partition to separate adjacent aerodynamic ducts in a stationary diffuser.
Figure 8B:
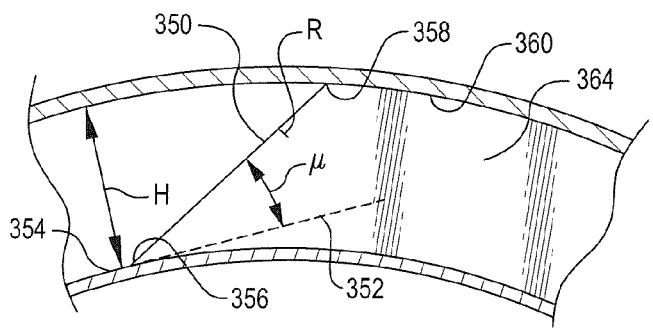
FIG. 8B is cross-section taken across line 8B-8B of FIG. 8A, showing a leading edge for an aerodynamic duct, and more specifically, how a leading edge may, in an embodiment, be provided in a swept-back configuration, that is sloping rearward in the flowwise direction.
Figure 8C:
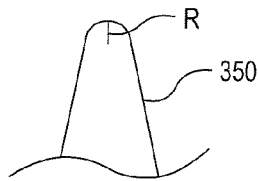
FIG. 8C is an enlarged portion of FIG. 8A, showing a suitable radius for a leading edge of an aerodynamic duct.

In an embodiment, for example as depicted in FIGS. 1 and 8, a diffuser 54 design may include aerodynamic ducts 56 which are polygonal in cross sectional shape, and such shape may include a variety of bounding walls, such as a floor, ceiling, and sidewalls. As used herein, the term radially inward bounding wall has been used to describe what might be also be considered a floor of an aerodynamic duct. As used herein, the term radially outward bounding wall has been used to describe what might be also considered a ceiling of an aerodynamic duct. As earlier noted, in an embodiment, aerodynamic ducts 56 may have a flow centerline $C_{LD}$ as shown in FIG. 1. Then, in such embodiment, orthogonal to the centerline line $C_{LD}$, the aerodynamic ducts 56 may be provided having a parallelogram cross-sectional shape, which may be in an embodiment a generally rectangular cross sectional shape at various points along the aerodynamic duct 56. In an embodiment, the centerline $C_{LD}$ may be generally helical. The height H of such a cross-section is shown in FIG. 8B, seen radially outward from a radially inward bounding wall 354 toward a radially outward bounding wall 360, at an entrance location to an aerodynamic duct 56, namely the lower front end 356 of leading edge 350. The width W of such a cross-section is depicted in FIG. 8 as between (and within) adjacent partition walls $364_1$ and $364_2$. In an embodiment, associated with the just noted cross-sectional shape, the aerodynamic ducts 56 may have an average aspect ratio, expressed as width W to height H, of about two to one (2:1), or more. In an embodiment, the aerodynamic ducts 56 may have an average aspect ratio, expressed as width W to height H, of about three to one (3:1), or more. In an embodiment, the aerodynamic ducts 56 may have an average aspect ratio, expressed as width W to height H, of about four to one (4:1), or more.

In various embodiments, the number of aerodynamic ducts 56 may be selected as useful given other design constraints. The number of aerodynamic ducts 56 included may be one or more, say in the range of from 1 to 11, or more, for example, 3, 5, 7, 9, or 11 aerodynamic ducts 56. The number of aerodynamic ducts for a given design may be selected as part of a design exercise that takes into account various factors including the direction of gas flow leaving the impulse rotor, and the velocity provided thereby, and the degree of growth of adverse boundary layers in configurations of various geometry. In an embodiment, the number of leading edges 350 for an inlet in a diffuser 54 may be equal to the number of aerodynamic ducts 56 in a diffuser 54, in a manner as such parts (e.g., aerodynamic duct $56_2$) are identified in FIG. 8. In many embodiments, design optimization may result in a plurality of aerodynamic ducts, so that velocity of gas leaving an impulse blade is maximized and boundary layer growth is minimized. In such embodiments, when optimizing a compressor design, an odd number 3, 5, 7, 9, or 11 of aerodynamic ducts 56 may be provided, and as just mentioned above, the number of leading edges 350 such diffusers 54 would be eleven (11), or less. By selection of an odd number of blades 46 in a rotor 42, an even number of aerodynamic ducts 56 may be provided, for example, 2, 4, 6, 8, 10, or more. In related parameters, in an exemplary stationary diffuser 54, the number of leading edges 350 in a diffuser 54 would be about one half (½) or less than the number of blades 46 provided in a rotor 42. In another embodiment, the number of leading edges 350 in a diffuser 54 would be about one quarter (¼) or less than the number of blades in a rotor 42. In a yet more efficient design, it is currently anticipated that the number of leading edges 350 in a diffuser 54 would be about fifteen percent (15%), or less, of the number of blades in a rotor 42. Minimizing the number of leading edges, and related aerodynamic ducts, minimizes drag and efficiency loss compared to various prior art stators, particularly those utilizing stator blades in number commensurate with or equivalent to the number of rotor blades provided.

In addition to improvements in the number, size, and shape of leading edges 350, and related aerodynamic duct 56 components, the provision of on-board supersonic shock starting capability, for example by use of bypass gas passageways, such as bypass gas sub-chambers 114, as shown in FIG. 4 (that is, sub-chambers below the radially inward bounding wall 58 of the aerodynamic duct 56) or outboard bypass gas chambers $282_1$, etc., as seen in FIG. 30, above a radially outward bounding wall 276) or internal bypass using internal starting bypass gas passageways 130 as defined by internal walls 131 of an internal gas passageway housing 133 as seen in FIG. 13, provides the ability to design for higher pressure ratios in a supersonic compressor. As an example, but not as a limitation, the bypass gas passageways 130 seen in FIG. 13 may be operable during establishment of a supersonic shock during startup, when the compressor 40 shown in FIG. 1 (or compressor 230 of FIG. 9) is designed for operating at an inlet relative Mach number of about 1.8, for removal of a quantity of from about eleven percent (11%) by mass to about nineteen percent (19%) by mass of the selected gas captured at the inlet by an aerodynamic duct 56. As a further example, but not as a limitation, the bypass gas passageways 130 may be operable during establishment of a supersonic shock during startup, when a compressor is designed for operating at an inlet relative Mach number of about 2.8, for removal of a quantity of from about thirty six percent (36%) by mass to about sixty one percent (61%) by mass of the inlet gas captured at the inlet by an aerodynamic duct 56. Those of skill in the art and to whom this specification is directed will undoubtedly be able to calculate and thus determine suitable bypass gas quantities that may be useful or required for enabling aerodynamic ducts used in a particular stator, given compressor design parameters, to swallow an incipient supersonic shock structure and to thus establish a stable supersonic shock structure at a desired location within the aerodynamic duct(s). Thus, the above noted ranges are to provide to the reader an appreciation of the amount of mass flow that may be required to establish a stable supersonic shock structure, and thus eliminate an un-started condition in the aerodynamic ducts in a stator. Various aspects of starting requirements are discussed by Lawlor, in U.S. Patent Application Publication No. US2009/0196731 A1, Published on Aug. 6, 2009, entitled "Method and Apparatus for Starting Supersonic Compressors," which is incorporated herein in its entirety by this reference. In particular, FIG. 3 of that publication provides a graphic illustration of typical ranges suitable for starting bypass gas removal requirements, shown as starting bleed fraction (defined by mass of bypass gas divided by mass of gas captured by the inlet) fraction, for aerodynamic ducts in a supersonic compressor operating at a selected inlet relative Mach number.

More generally, a compressor as described herein may be designed for providing gas to aerodynamic ducts, such as aerodynamic duct $56_1$ shown in FIG. 1, at an inlet relative Mach number in excess of about 1.8. Further, a compressor as described herein may be designed for an inlet relative Mach number to aerodynamic ducts of at least 2. Even further, a compressor as described herein may be designed for an inlet relative Mach number to aerodynamic ducts of at least 2.5. And, operation of supersonic compressors described herein is anticipated to be possible at designs having an inlet relative Mach number to aerodynamic ducts in excess of about 2.5. For many applications, a practical design is anticipated to utilize an inlet relative Mach number to aerodynamic ducts between about 2 and about 2.5, inclusive of such bounding parameters. Further, for various applications, as an example and not as a limitation, practical designs may be anticipated to utilize an inlet relative Mach number to aerodynamic ducts in the range of between about 2.5 and about 2.8. For other applications, even higher inlet Mach numbers may be practical in various designs, as an example, especially for those gases in which the speed of sound is relatively low, such as some of the refrigerant gases. On the other hand, for applications handling gases having a very high speed of sound, such as hydrogen, operation at much lower Mach numbers may provide commercially acceptable results. Consequently, the Mach number achievable for various designs should not be considered limited by such above noted suggestions, as an evaluation of design Mach numbers for particular applications may include a variety of design considerations.

Compressors as described herein may be provided for operation within a design operating envelope having a gas compression ratio of at least three (3). In other applications, compressors as described herein may be provided for operation within a design operating envelope having a gas compression ratio in a stage of compression of at least five (5). In yet other applications, compressors as described herein may be provided for operation within a design operating envelope having a gas compression ratio in a stage of compression of from about three point seven five (3.75) to about twelve (12). In yet other applications, compressors as described herein may be provided for operation within a design operating envelope having a gas compression ratio in a stage of compression of from about six (6) to about twelve point five (12.5). In certain applications, compressors as described herein may be provided for operation within a design operating envelope of gas compression ratios in a stage of compression of from about twelve (12) to about thirty (30).

When high compression ratios are required by design requirements, multistage compression may be employed, as suggested by the configuration schematically depicted for a compressor 400 in FIG. 34. A driver 402 such as electric motor or other mechanical drive may turn, through gearbox 404 where required, and via shaft 406, a first compressor rotor as described herein in a first compression stage 408, to compress entering low pressure gas 410 to provide a discharge intermediate pressure gas 412. A second compression stage 414, having a second compressor rotor and stator as described herein, compresses the intermediate pressure gas 412 to provide a high pressure outlet gas 416. In this manner, back to back compression stages may be provided in a plurality of stages as may be desired. Thus, high pressure ratios can be achieved by multistage operation. As an example, but without limitation, such configurations may be provided broadly provide overall pressure ratios (in the plurality of stages in series configuration) of from about fifty to one (50:1) to about two hundred to one (200:1). Or as another example, two stages of twenty to one (20:1) each will provide an overall compression ratio of about four hundred to one (400:1). Finally, it should be noted that multiple stages may also be provided in parallel configuration where multiple machines may be desired for capacity configurations.

In general, improved supersonic gas compressor designs for compressing a selected gas are provided by the teachings herein. In an embodiment, an exemplary compressor 230 as depicted in FIG. 9 may utilize a casing 234 having a low pressure gas inlet 236 and a high pressure gas exit 238. A rotor 100 with shrouded blades 103 may be provided for delivery of a selected gas at supersonic conditions to a stationary diffuser 54 or stator having a plurality of aerodynamic ducts 56, as seen in FIG. 1. In an embodiment, the aerodynamic ducts 56 may be wrapped helically in a diffuser 54. In an embodiment, adjacent aerodynamic ducts may have common partition walls therebetween. The aerodynamic ducts 56 have a converging portion and a diverging portion that with input of a supersonic gas flow generate a plurality of oblique shock waves ($S_1$ to $S_x$, as seen, for example, in FIGS. 28 through 30) and a normal shock wave ($S_N$) as the selected gas passes through the aerodynamic duct 56. In various designs, aerodynamic ducts 56 may have an inlet relative Mach number for operation associated with a design operating point selected within a design operating envelope for a selected gas composition, gas quantity, and gas compression ratio. Further, such a compressor may include means for adjusting the effective contraction ratio of some or all of the plurality of aerodynamic ducts, or of each of the aerodynamic ducts. The means for adjusting the effective contraction ratio may include bypass gas passageways for discharge of gas 113 from aerodynamic ducts to external discharge 118 or recycle 118' lines as seen in FIG. 4 above. The means for adjusting the effective contraction ratio may include internal bypass gas passageways 130, such as using internal gas passageway housing 133 devices 133 with inlet doors 140 and outlet doors 150 as conceptually depicted in FIGS. 13 and 14. The means for adjusting effective contraction ratio may include geometrically adjustable portions 160 as seen in FIGS. 11 and 12. Even further, as appropriate for a particular design configuration, means for controlling a boundary layer of gas flowing through each of the plurality of aerodynamic ducts may be provided. The means for controlling boundary layers may include boundary layer outlet bleed ports. The means for controlling boundary layers may include the use of inlet jets for injection gas into a boundary layer, to energize the same and increase the velocity of the boundary layer to a velocity more closely matching that of bulk fluid flow at a particular location in an aerodynamic duct. The means for controlling boundary layers may include the use of one or more vortex generators in an aerodynamic duct, to energize a boundary layer by moving gas via a vortex from a higher velocity bulk flow portion into a slower boundary layer flow, to thereby energize the boundary layer flow.

Various gases or gas mixtures may be selected for compression using designs taught herein. The compression of various hydrocarbon gases, such as ethane, propane, butane, pentane, and hexane, may benefit using compressors as taught herein. Further, gases or gas mixtures having a molecular weight of at least that of gaseous nitrogen (MW=28.02) will especially benefit using the designs taught herein. And, the efficiency of compression of heavier gases such as carbon dioxide (MW=44.01) may be especially improved by utilization of the compressor designs as taught herein. More generally, compression of those gases wherein Mach 1 occurs at relatively low velocity, such as that of methane (1440 feet/sec), and lower (such as ammonia, water vapor, air, carbon dioxide, propane, R410a, R22, R134a, R12, R245fa, and R123), may benefit from efficient supersonic compression.

The compression of various low molecular weight gases, and even those having high sonic velocity, may be efficiently achieved using the designs disclosed herein. In some applications, where higher compression ratios are desired, for example but not as a limitation, applications involving compression ratios in excess of about six (6) or so are sought, useful designs may be provided using the techniques taught herein. In one example, the compression of hydrogen (MW=2.0158) which has a speed of sound of about 4167 feet per second at about 77° F. (1270 meters per second at about 25° C.) may be effectively accomplished using the compressor configuration(s) taught herein, when constructed utilizing rotors with high strength and using a shrouded blade configuration. Such a design must be able to operate at high rotational rates to provide sufficient peripheral speed in order achieve a suitable supersonic design velocity at time of entry of gas to the aerodynamic ducts of a stator. As an example, with rotor tip speeds in the range of about 2,500 feet per second, using advanced graphite composite construction with shrouded rotor blades, compression ratios of up to about 5:1 may be achievable using the designs taught herein. Further advances in materials and manufacturing techniques may enable designs at even higher speeds and pressure ratios, or may provide reduced risk of mechanical failures when operating at or near the just noted design parameters.

It should be recognized that the stator design taught herein, namely using a plurality of aerodynamic ducts, especially when used in a helical, spiral, helicoidal, or similar curving structure wrapped about a longitudinal axis, may be especially useful for various stator applications in supersonic compression, further including, for example, as described in an improved gas turbine apparatus. Thus, the stator design itself is believed to be a significant improvement in the design of supersonic stators for diffusion of supersonic gas to produce high pressure gas, regardless of application for such gas compression.

Further to the details noted above, it must be reiterated that the aerodynamic ducts described herein may be utilized in configurations built on various substrate structural designs, and achieve the benefit of high compression ratio operation, while providing necessary features for starting of supersonic operation. In various embodiments, a plurality of aerodynamic ducts may be configured as if wrapped about a surface of revolution, as provided by such static structure. In an embodiment, a suitable static structure may be substantially cylindrical, and thus, in an embodiment, the ducts may be configured wrapped around the cylindrical structure. In an embodiment, the aerodynamic ducts of a stationary diffuser may be provided in a spiral configuration. In an embodiment the aerodynamic ducts of a stationary diffuser may be provided in helicoidal configuration, such as may be generated along a centerline by rotating an entrance plane shape about a longitudinal axis at a fixed rate and simultaneously translating it in the downstream direction of the longitudinal axis, also at a fixed rate. Thus, the term wrapped around a longitudinal axis shall be considered to include wrapping around such various shapes, as applicable.

In summary, the various embodiments using aerodynamic ducts with internal compression ramps configured as taught herein provide significantly improved performance over prior art bladed stator designs operating at supersonic inlet conditions, particularly in their ability to provide high total and static pressure ratios. In one aspect, this is because utilizing a minimum number of aerodynamic ducts, and associated leading edge structures, reduces loss associated with entry of high velocity gas into a diffuser. Moreover, the reduced static structure correspondingly reduces compressor weight and cost, especially compared to prior art designs utilizing large numbers of conventional airfoil shaped stator blades.

In the foregoing description, for purposes of explanation, numerous details have been set forth in order to provide a thorough understanding of the disclosed exemplary embodiments for the design of a novel supersonic compressor system for the efficient compression of gases. However, certain of the described details may not be required in order to provide useful embodiments, or to practice a selected or other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in a method described herein may have been described as multiple discrete activities, in turn, in a manner that is most helpful in understanding the present invention. However, the order of description should not be construed as to imply that such activities are necessarily order dependent. In particular, certain operations may not necessarily need to be performed precisely in the order of presentation. And, in different embodiments of the invention, one or more activities may be performed simultaneously, or eliminated in part or in whole while other activities may be added. Also, the reader will note that the phrase "in an embodiment" or "in one embodiment" has been used repeatedly. This phrase generally does not refer to the same embodiment; however, it may. Finally, the terms "comprising", "having" and "including" should be considered synonymous, unless the context dictates otherwise.

From the foregoing, it can be understood by persons skilled in the art that a supersonic compressor system has been provided for the efficient compression of various gases. Although only certain specific embodiments of the present invention have been shown and described, there is no intent to limit this invention by these embodiments. Rather, the invention is to be defined by the appended claims and their equivalents when taken in combination with the description.

Importantly, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures. Numerous modifications and variations are possible in light of the above teachings. Therefore, the protection afforded to this invention should be limited only by the claims set forth herein, and the legal equivalents thereof.

We claim:

1. A compressor, comprising:
a rotor having an axis of rotation and a plurality of blades extending into a gas flow passage, said plurality of blades sized and shaped to act on a selected gas to provide a supersonic gas flow; and
a stator comprising a diffuser disposed around a longitudinal axis and comprising one or more aerodynamic ducts, wherein said one or more of said aerodynamic ducts are helically arranged at a substantially constant helical angle about said longitudinal axis, said one or more aerodynamic ducts having an effective contraction ratio and comprising a converging portion and a diverging portion, said one or more aerodynamic ducts sized and shaped to decelerate said supersonic gas flow to subsonic conditions from a selected inlet Mach number, said diffuser comprising
   (a) geometrically adjustable portions operable to adjust said effective contraction ratio; and
   (b) boundary layer control structures comprising one or more vortex generators, said one or more vortex generators each comprising a base with a forward end and a leading edge extending outward and rearward from said forward end to an outward end, and wherein said leading edge comprises a first angular discontinuity at a height $H_1$ above said base, and a second angular discontinuity at a height $H_2$ above said base, for generating at least two (2) vortices.

2. The compressor as set forth in claim 1, wherein said leading edge comprises a first angular discontinuity at a height $H_1$ above said base, a second angular discontinuity at a height $H_2$ above said base, and a third angular discontinuity at a height $H_3$ above said base, for generating at least three (3) vortices.

3. The compressor as set forth in claim 2, wherein height $H_2$ is about 1.6 times the result of height $H_3$ minus height $H_2$.

4. The compressor as set forth in claim 1, wherein height $H_1$ is about 1.6 times the result of height $H_2$ minus height $H_1$.

5. The compressor as set forth in claim 1, wherein a plurality of vortex generators are provided in each of said aerodynamic ducts.

6. The compressor as set forth in claim 1, wherein one or more of said one or more aerodynamic ducts are helically arranged about said longitudinal axis.

7. The compressor as set forth in claim 1, wherein said diffuser comprises a stationary diffuser.

8. The compressor as set forth in claim 1, wherein said one or more vortex generators are located in said converging portion.

9. The compressor as set forth in claim 1, wherein said one or more vortex generators are located in said diverging portion.

10. The compressor as set forth in claim 1, further comprising outlet bleed ports for boundary layer removal, and bleed sub-chambers adjacent said one or more aerodynamic ducts, said bleed sub-chambers in fluid communication with said outlet bleed ports, said bleed sub-chambers configured for passage therethrough of said selected gas removed through said outlet bleed ports.

11. The compressor as set forth in claim 10, wherein said rotor further comprises a shroud for said plurality of blades.

12. The compressor as set forth in claim 1, wherein said rotor comprises a plurality of impulse blades.

13. The compressor as set forth in claim 1, wherein said rotor is effectively sealed with said diffuser, so as to minimize gas leakage during flow therebetween.

14. The compressor as set forth in claim 12, wherein said selected gas passing through said rotor is turned by an angle alpha ($\alpha$) of at least ninety (90) degrees.

15. The compressor as set forth in claim 12, wherein said selected gas passing through said rotor is turned by an angle alpha ($\alpha$) of at least one hundred (100) degrees.

16. The compressor as set forth in claim 12, wherein said selected gas passing through said rotor is turned by an angle alpha ($\alpha$) of at least one hundred ten (110) degrees.

17. The compressor as set forth in claim 12, wherein said selected gas passing through said rotor is turned by an angle alpha ($\alpha$) of between ninety (90) degrees and one hundred sixty (160) degrees.

18. The compressor as set forth in claim 12, wherein said selected gas passing through said rotor is turned by an angle alpha ($\alpha$) of between one hundred twelve (112) degrees and one hundred fourteen (114) degrees.

19. The compressor as set forth in claim 1, wherein each of said plurality of blades has a hub end, a tip end, and a trailing edge, and said supersonic gas flow is provided at said trailing edge of each of said plurality of blades from said hub end to said tip end.

20. The compressor as set forth in claim 1, wherein said diffuser further comprises bypass gas passageways positionable between an open, startup condition wherein discharge gas is passed therethrough, and a closed, operating condition which minimizes or stops passage of said discharge gas therethrough.

21. The compressor as set forth in claim 20, wherein said bypass gas passageways comprise external passageways fluidly connected with said one or more aerodynamic ducts.

22. The compressor as set forth in claim 1, wherein said geometrically adjustable portions are positionable between an open, startup condition wherein said converging portion allows sufficient flow of said selected gas through said one or more aerodynamic ducts to establish and position a normal shock within said one or more aerodynamic ducts, and a closed, operating condition in which said converging portion is set to a selected operating position.

23. The compressor as set forth in claim 1, wherein said geometrically adjustable portions, by change in position, change the contraction ratio of one or more of said one or more aerodynamic ducts.

24. The compressor as set forth in claim 23, wherein said geometrically adjustable portions further comprise pivotable members and actuators, said pivotable members driven by said actuators, and wherein said geometrically adjustable portions are sized and shaped to change the shape of said converging portion of said one or more of said one or more aerodynamic ducts when said geometrically adjustable portions are moved with said actuators.

25. A supersonic gas compressor for compressing a selected gas, comprising:
  a casing comprising a low pressure gas inlet and a high pressure gas exit;
  a rotor comprising a plurality of blades and configured to act on a selected gas to impart axial and tangential velocity thereto to provide a supersonic gas flow;
  a stator comprising a diffuser including one or more aerodynamic ducts configured for diffusing a gas received therein, said one or more aerodynamic ducts each having a converging portion, a diverging portion, and an effective contraction ratio, such that, with input of a supersonic gas flow, each aerodynamic duct generates a plurality of shock waves ($S_1$ to $S_x$) in said selected gas as said selected gas passes therethrough, said one or more aerodynamic ducts having an inlet relative Mach number for operation associated with a design operating point selected within a design operating envelope for a selected gas composition, gas quantity, and gas compression ratio, wherein said one or more of said aerodynamic ducts are helically arranged around a longitudinal axis, said one or more aerodynamic ducts comprising
  (a) a geometrically adjustable portion, operable to adjust said effective contraction ratio, and
  (b) boundary layer control structures, said boundary layer control structures comprising one or more of (1) outlet bleed ports for boundary layer removal, (2) inlet jets for energizing a boundary layer by gas injection, and (3) one or more vortex generators, said one or more vortex generators each comprising a base with a forward end and a leading edge extending outward and rearward from said forward end to an outward end, wherein said leading edge comprises a first angular discontinuity at a height $H_1$ above said base, and a second angular discontinuity at a height $H_2$ above said base, for generating at least two (2) vortices.

26. The compressor as set forth in claim 25, wherein each of said one or more aerodynamic ducts has a centerline, and wherein orthogonal to said centerline, one or more of said one or more aerodynamic ducts have a generally parallelogram cross-sectional shape.

27. The compressor as set forth in claim 26, wherein associated with said cross-sectional shape, said one or more aerodynamic ducts have an average aspect ratio, expressed as width to height, of two to one (2:1), or more.

28. The compressor as set forth in claim 26, wherein associated with said cross-sectional shape, said one or more of aerodynamic ducts have an average aspect ratio, expressed as width to height, of three to one (3:1), or more.

29. The compressor as set forth in claim 26, wherein associated with said cross-sectional shape, said one or more aerodynamic ducts have an average aspect ratio, expressed as width to height, of four to one (4:1), or more.

30. The compressor as set forth in claim 1 or in claim 25, wherein said inlet relative Mach number of said one or more aerodynamic ducts is in excess of 1.5.

31. The compressor as set forth in claim 1, or in claim 25, wherein said inlet relative Mach number of said one or more aerodynamic ducts is in excess of 1.8.

32. The compressor as set forth in claim 1, or in claim 25, wherein said inlet relative Mach number of said one or more aerodynamic ducts is at least 2.

33. The compressor as set forth in claim 1, or in claim 25, wherein said inlet relative Mach number of said one or more aerodynamic ducts is at least 2.5.

34. The compressor as set forth in claim 1, or in claim 25, wherein said inlet relative Mach number of said one or more aerodynamic ducts is in excess of 2.5.

35. The compressor as set forth in claim 1, or in claim 25, wherein said inlet relative Mach number of said one or more aerodynamic ducts is between 2 and 2.5.

36. The compressor as set forth in claim 1, or in claim 25, wherein said inlet relative Mach number of said one or more aerodynamic ducts is between 2.5 and 2.8.

\* \* \* \* \*